(12) United States Patent
Mysore et al.

(10) Patent No.: US 6,810,426 B2
(45) Date of Patent: Oct. 26, 2004

(54) METHODS AND SYSTEMS PROVIDING FAIR QUEUING AND PRIORITY SCHEDULING TO ENHANCE QUALITY OF SERVICE IN A NETWORK

(75) Inventors: Manamohan D. Mysore, Calabasas, CA (US); Florence C. Pagan, Los Angeles, CA (US); Joel E. Short, Los Angeles, CA (US); Vijay Krishna Bhagavath, San Ramon, CA (US)

(73) Assignee: Nomadix, Inc., Westlake Village, CA (US)

( * ) Notice: Subject to any disclaimer, the term of this patent is extended or adjusted under 35 U.S.C. 154(b) by 313 days.

(21) Appl. No.: 10/060,273

(22) Filed: Jan. 30, 2002

(65) Prior Publication Data

US 2002/0178282 A1 Nov. 28, 2002

Related U.S. Application Data

(60) Provisional application No. 60/265,415, filed on Jan. 30, 2001.

(51) Int. Cl.$^7$ ............................................. G06F 15/16
(52) U.S. Cl. ....................... 709/234; 709/231; 709/235; 709/238; 709/242; 707/4; 707/7; 370/230; 370/412
(58) Field of Search .............................. 709/227–228, 709/231–238, 242; 707/1, 3–7, 10, 101–102, 200–201; 370/229–231, 412–413

(56) References Cited

U.S. PATENT DOCUMENTS 6,058,389 A  *  5/2000  Chandra et al. ................ 707/1

(List continued on next page.)

OTHER PUBLICATIONS

M. Shreedhar, George Varghese; *Efficient Fair Queuing Using Deficit Round Robin*; Proceedings of the International Workshop on Community Networking; XX, XX, Aug. 1, 1995; pp. 231–242; XP000541659.

(List continued on next page.)

*Primary Examiner*—Bharat Barot

(57) ABSTRACT

Integrated Bandwidth Latency Scheduler apparatus, method and system (collectively, IBLS) combines Fair Queuing and Priority Schedulers in a single stage to provide bandwidth fairness guarantees as well as latency prioritization. The IBLS includes a scheduler and process that dequeues packets from multiple queues in an order based upon an algorithm of the IBLS that arranges and dequeues those queues having the highest priority based on content therein. The IBLS also utilizes quotas and deficit counters to ensure that packets from each source receive their fair portion of the outgoing link bandwidth. To determine which first in first out queue an incoming data packet is placed, the enqueue agent utilized by the present invention classifies incoming packets based on the type of data included within the data packet, the source of the packet, the type of data flow, or another attribute of the packet, such as a header associated with the packet. Additionally, a weighted fair queuing algorithm provides express paths to latency critical components of user flows while providing overall bandwidth guarantees, and uses bandwidth borrowing from non-critical flows to ensure latency prioritization for high priority flows.

66 Claims, 13 Drawing Sheets

U.S. PATENT DOCUMENTS

| | | | |
|---|---|---|---|
| 6,094,663 A * | 7/2000 | Snow et al. | 707/201 |
| 6,343,066 B2 | 1/2002 | Magill et al. | |
| 6,405,258 B1 * | 6/2002 | Erimli et al. | 709/235 |
| 6,418,118 B1 | 7/2002 | Hay et al. | |
| 6,453,356 B1 * | 9/2002 | Sheard et al. | 709/231 |
| 6,496,516 B1 | 12/2002 | Dabecki et al. | |
| 6,510,531 B1 * | 1/2003 | Gibbons | 707/7 |
| 6,563,793 B1 | 5/2003 | Golden et al. | |
| 6,615,215 B1 * | 9/2003 | Petty | 707/101 |
| 6,625,121 B1 * | 9/2003 | Lau et al. | 370/230 |
| 6,724,767 B1 * | 4/2004 | Chong et al. | 709/238 |
| 6,728,792 B2 * | 4/2004 | Wagner | 707/7 |

OTHER PUBLICATIONS

Cisco Systems, Inc.; *Interface Queue Management* (white paper); "Online!"; Aug. 3, 1995; 12 pages; INET; XP002210177; available at <cisco.com/warp/public/614/16.html> (retreived on Aug. 16, 2002).

B. Braden, D. Clark, J. Crowcroft, B. Davie, S. Deering, D. Estrin, S. Floyd, V. Jacobson, G. Minshall, C. Partridge, L. Peterson, K. Ramakrishan, S. Shenker, J. Wroclawski, L. Zhang; RFC2309 *Recommendations on Queue Management and Congestion Avoidance in the Internet*; Apr. 1998; 13 pages; "Online!" IETF, INET XP002210176; available at <faqs.org/rfcs/rfc2309.html> (retreived on Aug. 16, 2002).

* cited by examiner

Enqueue Process

Dequeue Process

METHODS AND SYSTEMS PROVIDING FAIR QUEUING AND PRIORITY SCHEDULING TO ENHANCE QUALITY OF SERVICE IN A NETWORK

RELATED APPLICATION DATA

The present application claims priority from U.S. Provisional Application No. 60/265,415, titled "METHODS AND SYSTEMS PROVIDING FAIR QUEUING AND PRIORITY SCHEDULING TO ENHANCE QUALITY OF SERVICE IN A NETWORK", filed Jan. 30, 2001, the entire contents of which are incorporated herein by reference.

FIELD OF THE INVENTION

The present invention relates to network communication, and more specifically, to apparatuses, methods and systems for enhancing quality of service in a network.

BACKGROUND OF THE INVENTION

In the current state of the Internet, the issues of guaranteed bandwidth fairness and support for multiple levels of latency are becoming increasingly important. Guaranteed bandwidth fairness is typically provided using so called "Fair Queuing" algorithms. These algorithms guarantee that bandwidth of a certain link (or virtual link) is fairly apportioned among its various flows. Fair Queuing algorithms are incorporated into network systems using fair queuing (or bandwidth) schedulers. These schedulers seek to control congestion even in the presence of ill-behaved sources, so that a single source that sends packets to a gateway at a sufficiently high speed cannot capture an arbitrarily high portion of the bandwidth of the outgoing line. While providing bandwidth guarantees is important, it is also important that latency-critical traffic flows (such as Voice Over IP and Video) experience as low latency as possible. Prioritizing traffic flows so that latency-critical flows experience low latency is currently provided by priority (or latency) schedulers.

Conventional network solutions have attempted to resolve both fair queuing and priority scheduling, and, despite the inherent tension between the two concerns, have been somewhat successful in incorporating both features in network systems. For instance, according to one conventional solution shown in FIG. 1, conventional schedulers 120 have been created that cascade both fair queuing 100 and priority schedulers 110 in series to achieve fair queuing and low latency for latency-critical traffic. Fair queuing schedulers 100 have been proposed in which gateways maintain separate queues for packets received from each individual source. In many fair queuing schedulers, the queues are then serviced in a round-robin manner, which prevents a source from arbitrarily increasing its share of bandwidth or the delay of other sources. Therefore, when a source sends packets too quickly, it may effectively lengthen its own queue, thereby preventing anti-social behavior and limiting the negative impact on well-behaved sources. Other schedulers, some of which use a round-robin-based approach, have attempted to resolve problematic sources that send very long packets of data, which can get more bandwidth than other sources. However, these attempts suffer from some disadvantages, including that cascading the schedulers often results in erroneous queuing. Furthermore, arrangements such as those illustrated in FIG. 1 can require a substantial amount of packet processing.

One method for maintaining quality of service for networks, Deficit Round Robin (DRR), is a well-known fair queuing algorithm that is relatively efficient, simple, and is increasingly being accepted as a standard for fair queuing. DRR guarantees fair apportioning of bandwidth, provides close-to-perfect fairness in scheduling, and provides fast and lightweight enqueuing and dequeuing operations. DRR also provides O(1) time complexity, which means that the algorithm's computation does not grow with input size (the number of queues). As a result, the processing time taken by the algorithm is independent of the number of queues. DRR is next explained in detail with reference to prior art FIGS. 2, 3A and 3B, although it should be appreciated that DRR is well known to those of skill in the art.

FIG. 2 shows a DRR queue structure 200 implemented by the DRR algorithm. The DRR queue structure 200 is located between an incoming link 210 and an outgoing link 220, and operates to buffer data packets. Incoming packets from data sources received via the incoming link 210 are queued in the DRR queue structure 200 by an enqueue agent 230. The enqueue agent 230 typically creates a queue for each source forwarding data packets over the incoming link. According to one embodiment of DRR, queues are created and ordered sequentially based on the time data packets arrive at the queue structure 200. Therefore, a first data packet from a first source may be buffered into a first queue position in the queue structure 200, whereas a later received data packet from a separate source may be placed in a queue positioned lower in the queue structure 200. After the packets are queued onto the DRR queue structure 200, a dequeue agent 240 removes the packets from the DRR queue structure 200 and transmits the packets over the outgoing link 220. The implementations of the enqueue agent 220 and dequeue agent 240 constitute the DRR queuing algorithm. According to DRR queuing, the dequeue agent 240 intelligently dequeues the packets from the DRR queue structure 200 based on bandwidth apportioning specifications and places the packets on the outgoing link. One implementation of the DRR queue structure 200 consists of an array of linked lists of packets, which ensures that each queue (for example, the nth queue) can be accessed quickly. Additionally, the head and tail pointers of the linked list are stored so as to enable sufficient enqueuing and dequeuing.

According to one implementation of DRR, there is typically a deficit 250 data element and a quota 260 data element. According to the DRR algorithm, each data flow that is assured a share of bandwidth has a corresponding first in first out queue inside the DRR, and each queue within the DRR queue structure 200 has a deficit and quota associated therewith. The quota 260 data element of a queue is the number of bytes of data the queue will send per cycle when viewed from a long-term average. The deficit 250 refers the number of bytes of data that a queue can send in the current round. According to a general weighted variant of DRR, the quotas of the various queues of the DRR are initially set so that the ratios of the quotas are in accordance with the intended apportioning of bandwidth among flows. However, in the example presented in FIG. 3., all quotas are equal and hence coalesced into a single data element termed Quantum. One skilled in the art would appreciate that in the most general case, each queue would have its corresponding quota. In operation, the enqueue agent 230 enqueues an arriving packet into the packet's appropriate queue. The dequeue agent 240 then continuously steps through the queues in a round-robin fashion and sends as many packets from a queue as allowed by its deficit. At the end of each round, the deficit of a non-empty queue is increased by the quantum (and in the most general case, by its quota), as maintained in the quota element. Thus, if a packet cannot be sent for want of deficit, that remaining deficit is retained and increased by its quota in the next round. As a result, past unfairness due to packet boundaries is corrected in subsequent rounds. However, it should be appreciated that queues that are empty (i.e., have no packets located therein) at the end of the round do not retain and add their current deficit to that of the next round. The past deficit is then ignored since it was not being made use of and hence did not cause any unfairness.

The operation of DRR is illustrated in FIGS. 3a and 3b, which show a queue structure having four queues 310, labeled 1 through 4, where each queue has buffered a plurality of packets. As referred to herein, the fourth queue, labeled queue #4, has a greater queue number than queues one through three. For instance, in FIG. 3a, the first queue (labeled queue #1) includes packets having 200, 750 and 20 data elements (e.g., each data element is a byte of data), while the second queue (labeled queue #2) includes packets of 500 and 500 data elements. The packets are buffered in each respective queue sequentially, such that the packets arriving first enter the queue before packets arriving later in time. For instance, in the first queue of FIG. 3a, the packet having 200 data elements is first in the queue because it arrived before those packets sized at 750 and 20 data elements. Similarly, the packet having 750 data elements is second in the queue because it arrived before the packet sized at 20 data elements. Because DRR operates on a first in first out basis within each queue, the packet that enters the queue earliest in time is the first packet that will be dequeued and transmitted over an outgoing link. Also illustrated in FIGS. 3a and 3b is a deficit counter 320 for maintaining the current deficit, as explained earlier. At the beginning of each round, non-empty queues have their deficit counters increased by the Quantum, whereas empty queues have their deficit counters set to the Quantum. In this example of DRR there is no notion of a per-queue quantum or quota, but rather a global quantum that applies to all queues. However, a variant of DRR (which is usually termed weighted DRR) has queue-specific quotas. Referring again to FIG. 3a, the value of the deficit counter 320 establishes the number of units of data that will be dequeued from the corresponding queue by the dequeue agent during a current round of the deficit round robin process.

FIG. 3a shows the state of the queue structure during an initial state of the DRR operation. In this state, a round robin pointer (or dequeue agent) 340 initially points to the first queue within the queue structure. The deficit counter 320 shows a value of 500 data elements in FIG. 3a because the quantum size 330 is added to the queue's current deficit maintained by the deficit counter 320, which is initially zero for each individual queue in the present illustration. However, it will be appreciated by those of skill in the art that the deficit counter 320 can alternatively be initially set at any value for each queue. After the quantum size 330 (500) is added to the deficit counter 320, the first packet of data buffered by the first queue, sized at 200 data elements, is compared to the data element value maintained in the deficit counter 320 that corresponds to the first queue (500). Because the deficit counter 320 contains a data element value equal to or greater than the number of data elements in the packet (500>200), the packet is removed from the queue structure by the dequeue agent and transmitted over an outgoing link. The deficit counter is then reduced by the number of data elements within the transmitted packet. Because the transmission of the packet did not utilize the first queue's entire allotment of deficit (500−200=300), the next packet in the first queue is then compared in the same manner as the first to the new value of the deficit counter, and this process is repeated until the deficit counter has insufficient deficit to transmit a packet.

Continuing with the illustrative example shown in FIG. 3a, the value of the deficit counter is reduced to 300 after the first packet is transmitted. Repeating the steps discussed above in processing the first packet, the DRR algorithm compares the new, reduced deficit counter 320 value to the size of the next packet, which has 750 data elements. Because the deficit counter 320 value is not greater than or equal to the size of the packet, the packet is not transmitted over the outgoing link, thereby preventing the source populating the first queue from utilizing a disproportionate share of the outgoing link bandwidth. However, as illustrated in FIG. 3b, the deficit counter 320 retains the unused allocation of data elements (300), which remain in the deficit counter 320 for use by the first queue during the next transmission attempt. Thereafter, the round robin pointer 340 moves to the second queue in the queue structure, and repeats the steps described above with respect to the first queue.

The DRR algorithm repeats the above steps by continuously stepping through the queues in a round-robin fashion, sending as many packets from each queue as allowed by its deficit and the quantum size. For instance, when the round robin pointer selects the first queue during the second round, the quantum size (500) will be added to the deficit (300), yielding a total of 800 data elements in the deficit counter 320. Therefore, the packet with 750 data elements and the packet with 20 data elements will both be dequeued and transmitted out an outgoing link, because 800>(750+20).

In sum, DRR in its most general form arranges each queue to have an associated bandwidth, quota and down counted deficit, where the deficit is the amount of data a queue can send in the current round. The deficit keeps track of past unfairness and each queue's quota is added to its deficit at the beginning of each round. The queues send packets on a round robin basis, and a packet is sent from the queue only when the queue has sufficient deficit. When a packet is sent from the queue its size is subtracted from the deficit. If a packet is unable to be sent due to insufficient deficit, the remaining deficit is added to the next round's deficit, thereby correcting unfairness in subsequent rounds. Finally, it should be appreciated that the worst case cycle time in DRR is proportional to the sum of the queue bandwidth quotas divided by the bandwidth.

Although DRR is relatively efficient, simple, and is increasingly being accepted as a standard for fair queuing, DRR suffers from a number of problems that are undesirable for fair queuing of all types of traffic. For instance, DRR can cause packets to suffer high latency, causing DRR to be unsuitable for latency critical flows, such as Voice Over IP. DRR also does not have mechanisms for handling multiple levels of latency critical flows. Additionally, DRR is a fair bandwidth scheduler, rather than a prioritized latency scheduler.

Therefore, it will be appreciated that it would be advantageous to have a fair queuing and priority scheduling solution providing multiple levels of latency. It would also be advantageous to incorporate both fair queuing and priority scheduling, to work in unison and overcome latency-related problems associated with DRR. It would also be advantageous to implement both features to provide a fair bandwidth prioritized latency scheduler rather than merely a fair bandwidth scheduler, as is provided by DRR.

SUMMARY OF THE INVENTION

According to one embodiment of the present invention, there is provided an Integrated Bandwidth Latency Scheduler apparatus, method and system (collectively referred to herein as IBLS) that combines Fair Queuing and Priority Schedulers in a single stage to provide bandwidth fairness guarantees as well as latency prioritization. The IBLS accomplishes these goals by providing a scheduler and process that dequeues packets from multiple queues in an order based upon an algorithm of the IBLS that arranges and dequeues those queues having the highest priority based on content therein. However, the systems, methods and apparatuses of the present invention also utilize quotas and deficit counters, similar to the DRR process described above, to ensure that packets from each source receive their fair portion of the outgoing link bandwidth. To determine which first in first out queue an incoming data packet is placed, the enqueue agent utilized by the present invention classifies incoming packets based on the type of data included within the data packet, the source of the packet, the type of data flow, or another attribute of the packet, such as a header associated with the packet.

IBLS obviates the need for two stages of queuing to achieve both bandwidth and priority-based scheduling and thus reduces per-packet latency. By means of a novel way of dequeuing packets, IBLS ensures that latency critical flows experience a lower latency than other flows. While doing so, IBLS makes sure that bandwidth fairness is not compromised. To achieve this, it ensures that both bandwidth scheduling and prioritized latency scheduling work in unison without causing correctness problems. The bandwidth scheduler functionality within the IBLS decides how many packets are allowable from each queue in the current round, whereas the priority scheduler functionality makes sure that among these packets, those of higher latency critically get sent earlier. Furthermore, under typical loads, the IBLS of the present invention provides a significant amount of latency differentiation over conventional scheduling algorithms such as DRR. IBLS reduces jitter of high priority flows under usual loads. IBLS also provides better bandwidth fairness than DRR on a per cycle (i.e. round) basis. The latency differentiation effect of IBLS diminishes in times of extreme congestion. And IBLS not only avoids queuing-theoretic flaws introduced by a two-stage design, but also reduces the latency experienced by a packet. Therefore, the IBLS approach is of great benefit in systems that need both bandwidth fairness and latency differentiation.

Also provided in the present invention is a weighted fair queuing algorithm providing express paths to latency critical components of aggregated flows while providing bandwidth guarantees to aggregated user flows. Therefore, although aggregated user flows may consist of traffic components of varying importance, the present invention makes it is possible to isolate and provide a lower latency to latency critical components of such aggregated user flows, while still ensuring that all aggregated flows still experience their overall share of fair bandwidth. The latency critical components of aggregated flows can be separated and placed in a latency critical queue while the non-latency-critical components of aggregated flows use non-latency-critical queues corresponding to their respective user flows. The dedicated queues and bandwidth borrowing features of the present invention apportion link bandwidth among users, ensure fair sharing of extra bandwidth among various users, and provide fast paths for latency critical application flows.

BRIEF DESCRIPTION OF THE DRAWINGS

Figure 1:
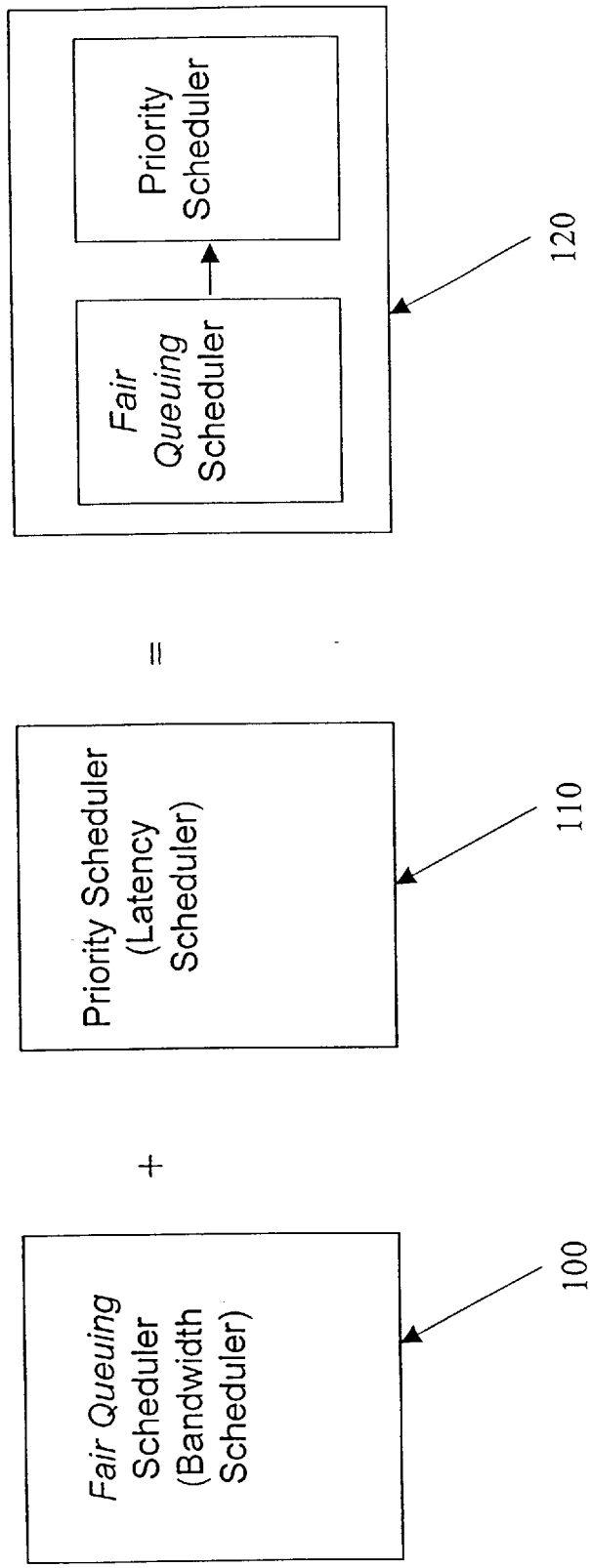

Having thus described the invention in general terms, reference will now be made to the accompanying drawings, which are not necessarily drawn to scale, and wherein:

FIG. 1 shows a fair queuing scheduler combined in series with a priority scheduler, according to the prior art.

Figure 2:
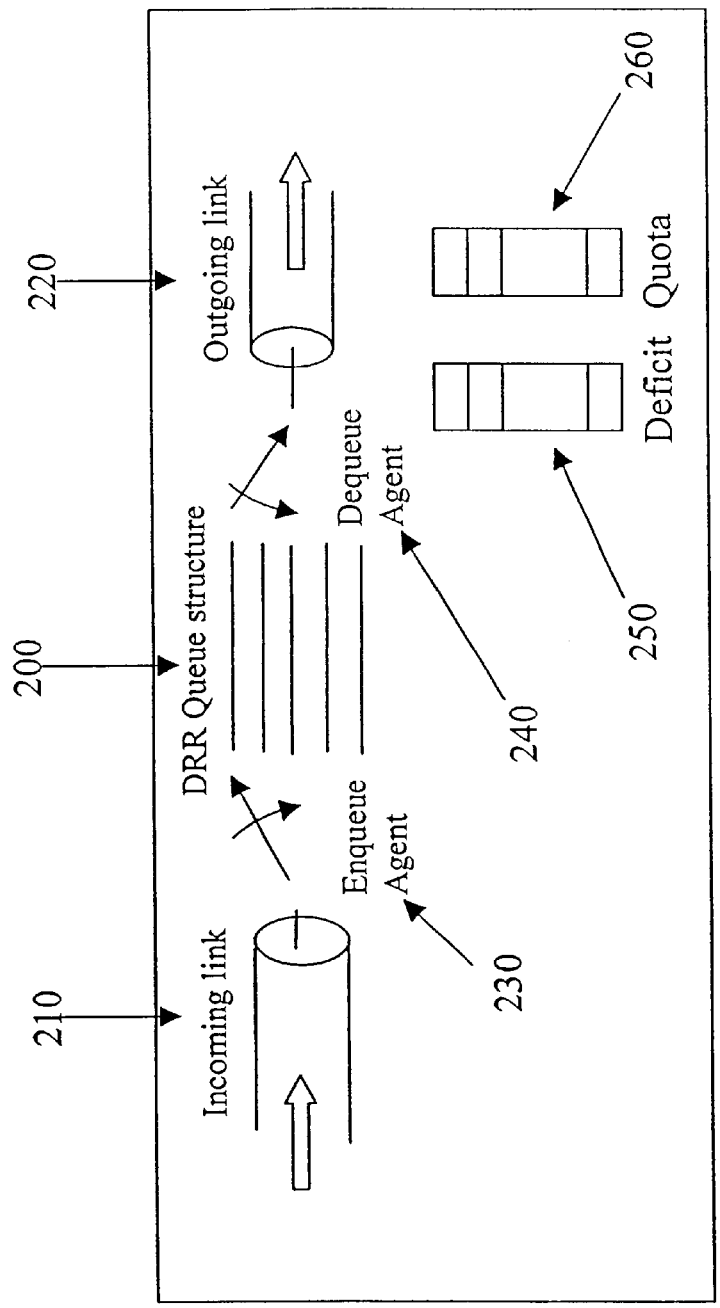

FIG. 2 shows a DRR queue structure according to the prior art.

Figure 3B:
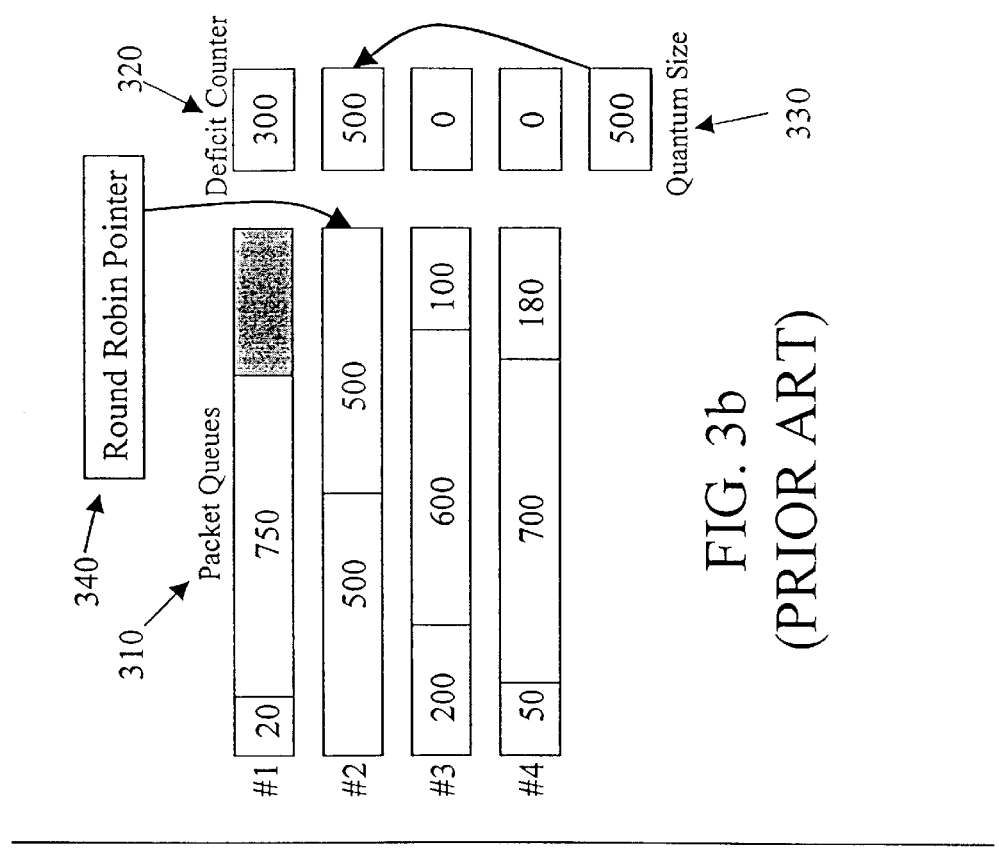
Figure 3A:
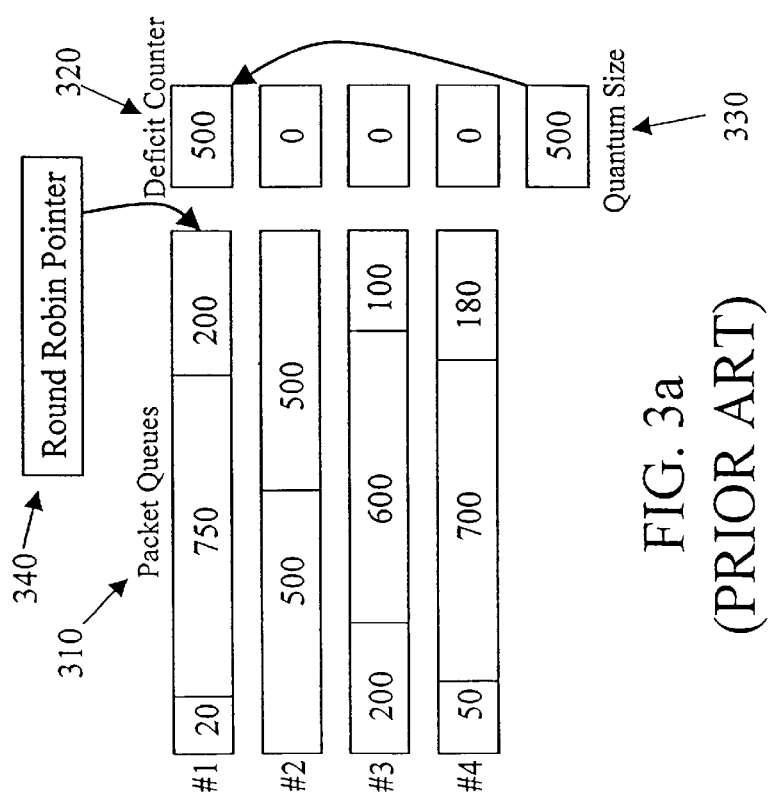

FIG. 3a shows an illustrative example of the operation of DRR, according to the prior art.

FIG. 3b shows an illustrative example of the operation of DRR, according to the prior art.

Figure 4:
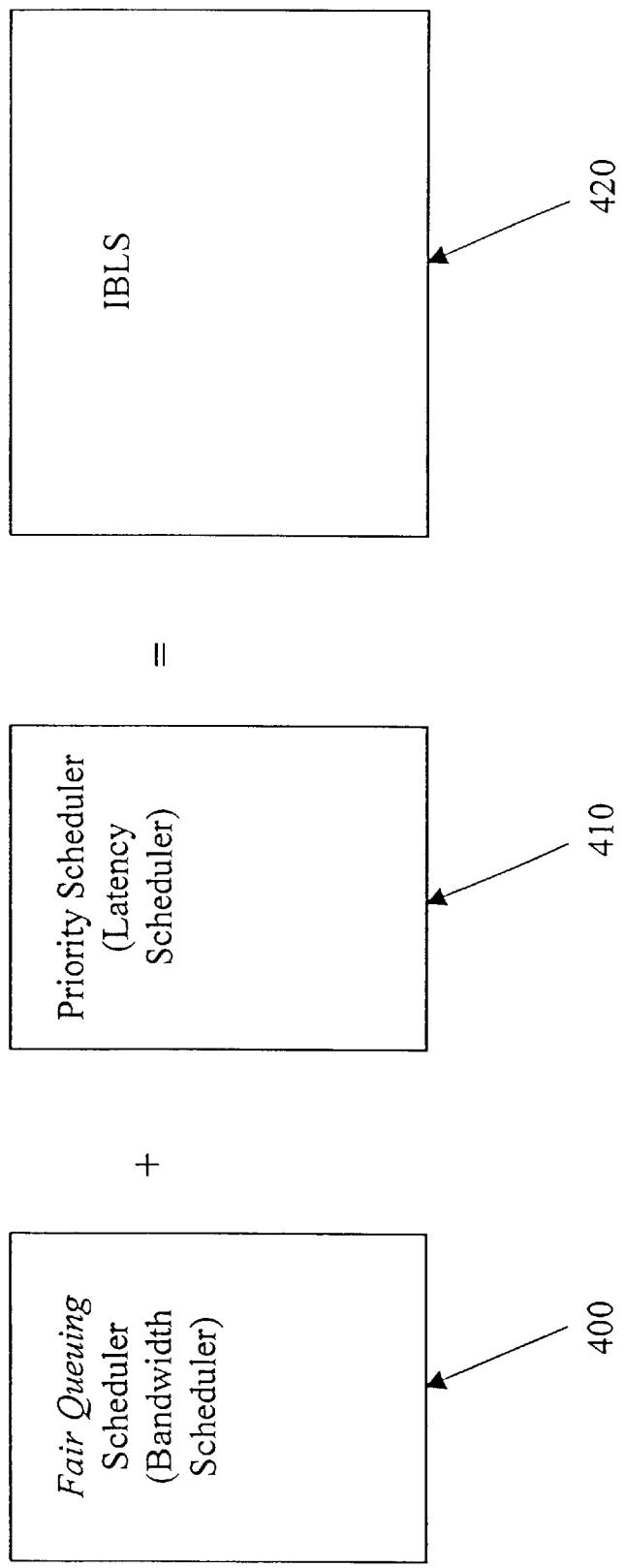

FIG. 4 shows a block diagram of an IBLS, according to one embodiment of the present invention.

Figure 5:
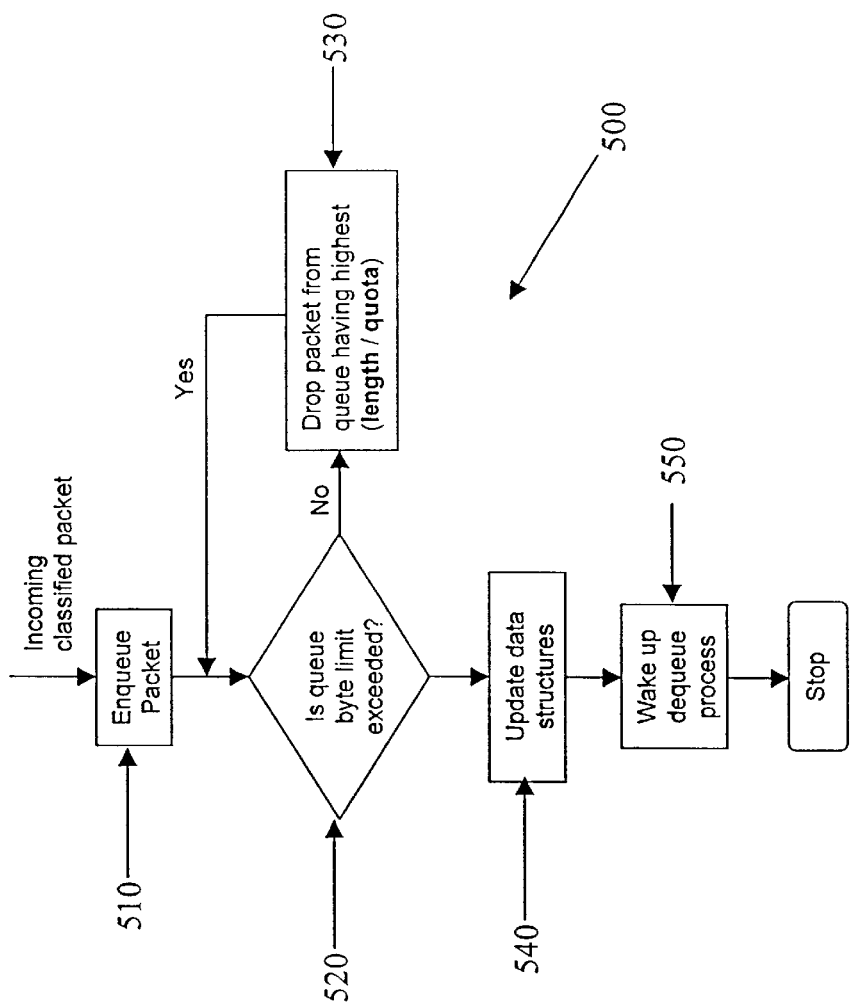

FIG. 5 illustrates in block diagram form an enqueue process of the IBLS, according to one embodiment of the present invention.

Figure 6:
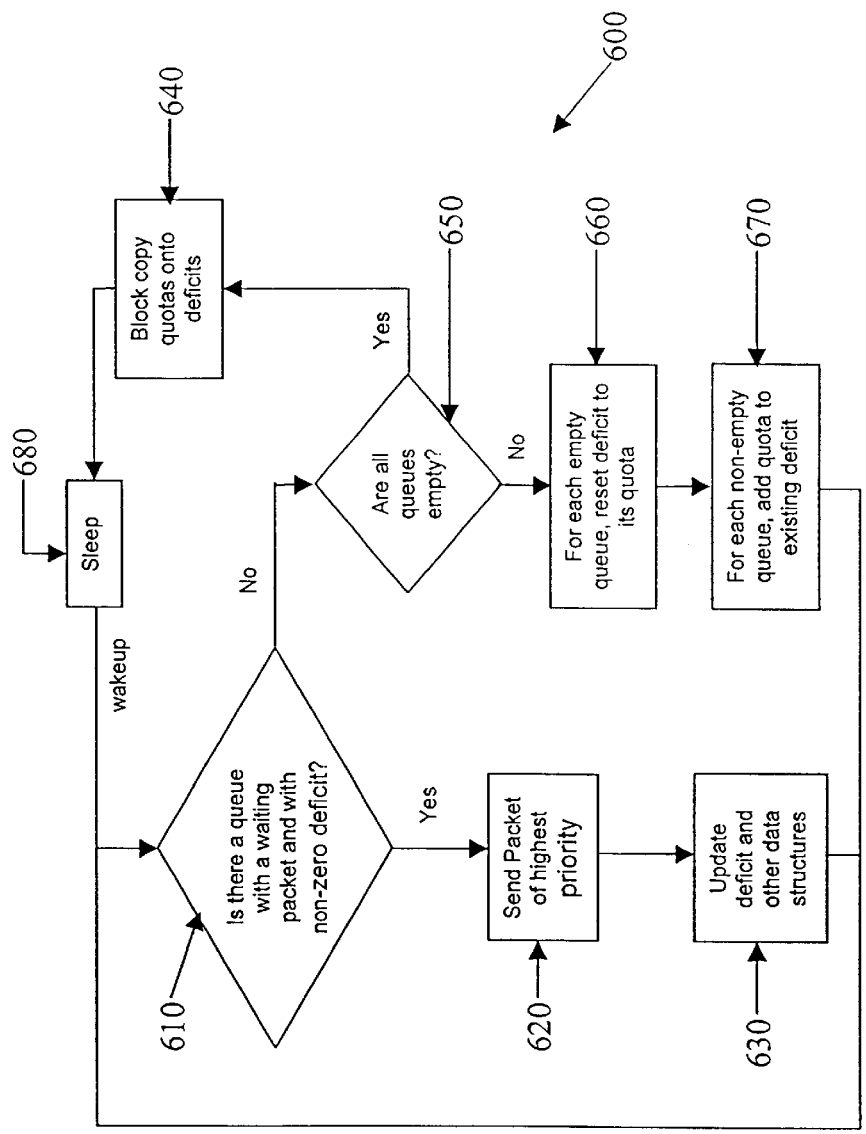

FIG. 6 illustrates in block diagram form a dequeue process of the IBLS, according to one embodiment of the present invention.

Figure 7:
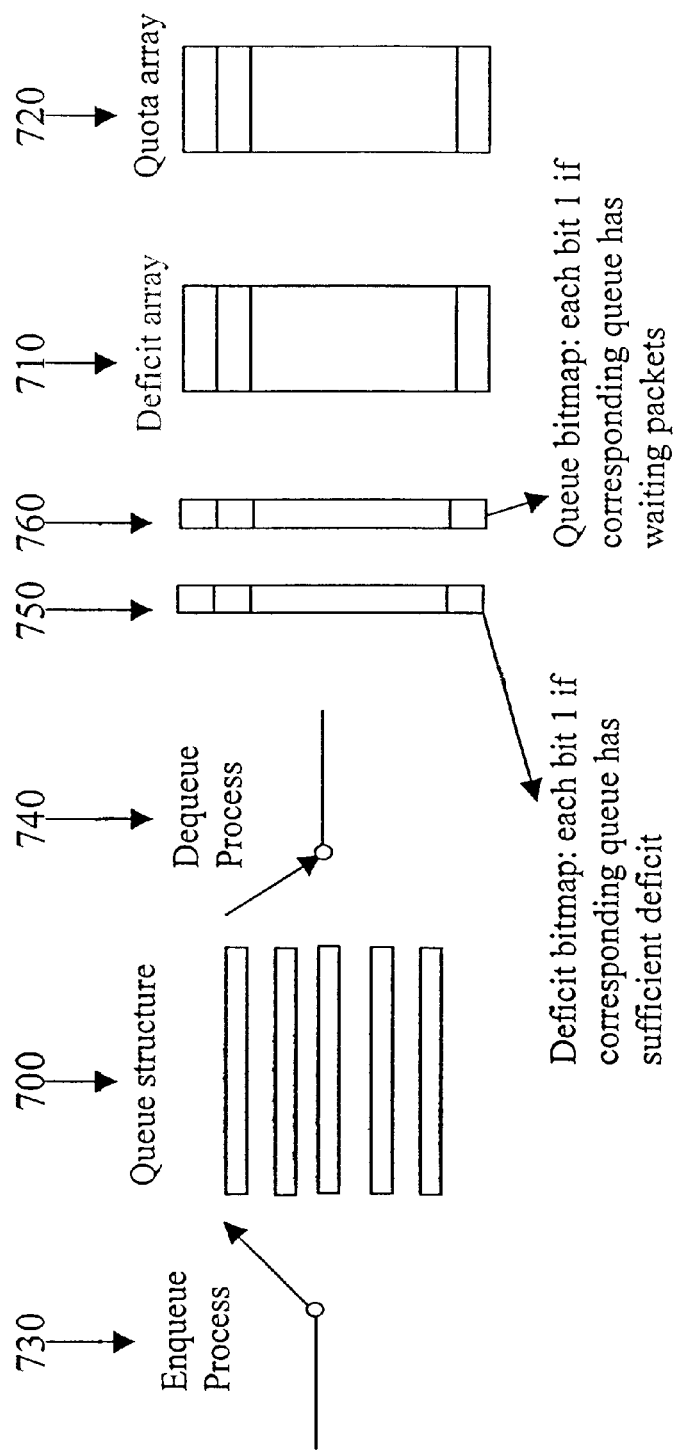

FIG. 7 shows IBLS data structures, according to one aspect of the present invention.

Figure 8:
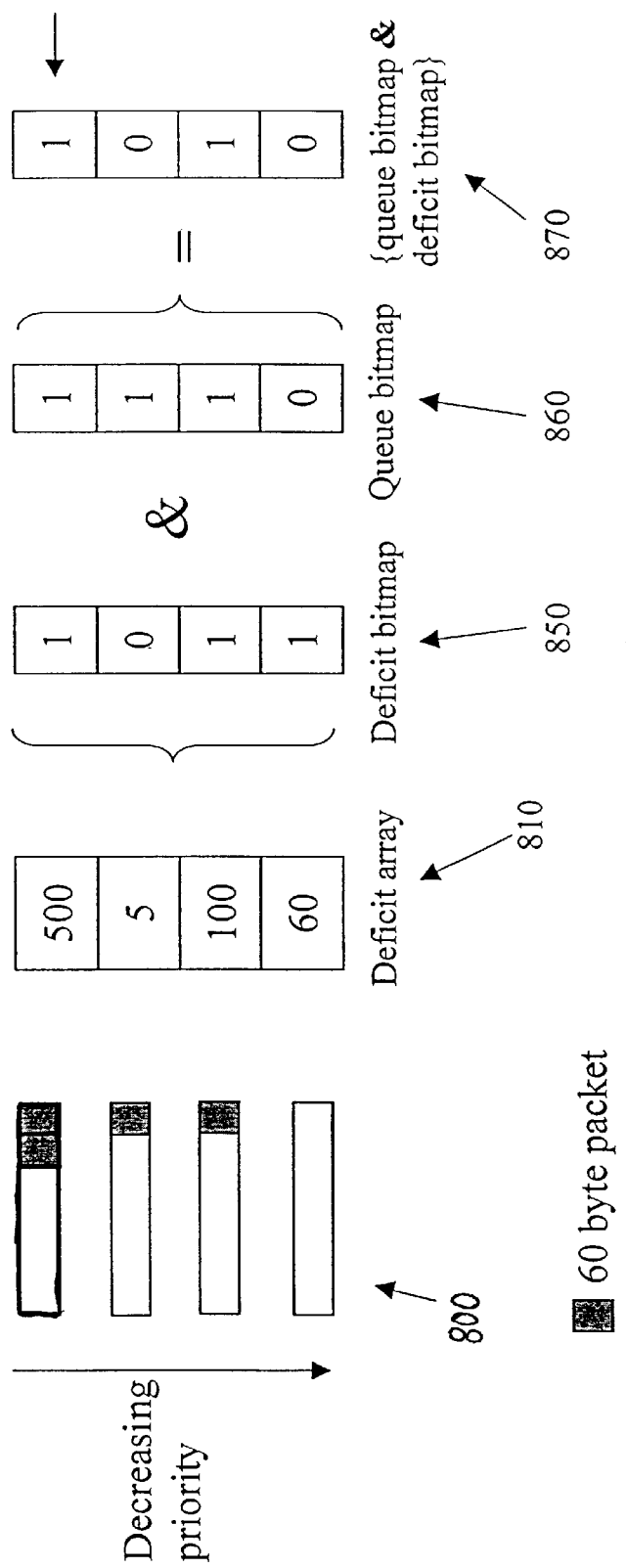

FIG. 8 illustrates multiple queues having associated deficit arrays, and the AND product of an associated deficit bitmap and queue bitmap, according to one illustrative example of the present invention.

Figure 9:
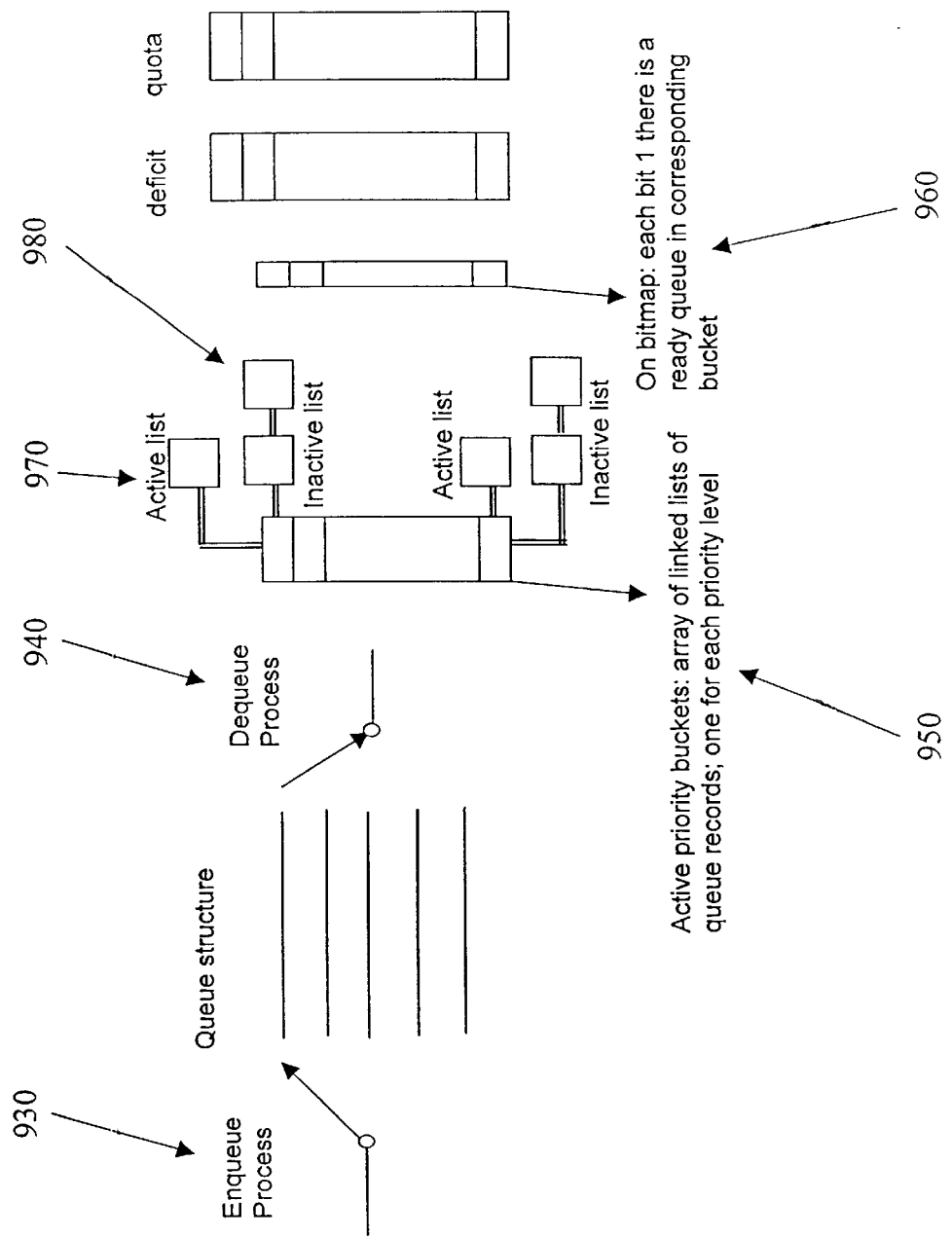

FIG. 9 shows IBLS data structures, according to an alternative embodiment of the present invention.

Figure 10:
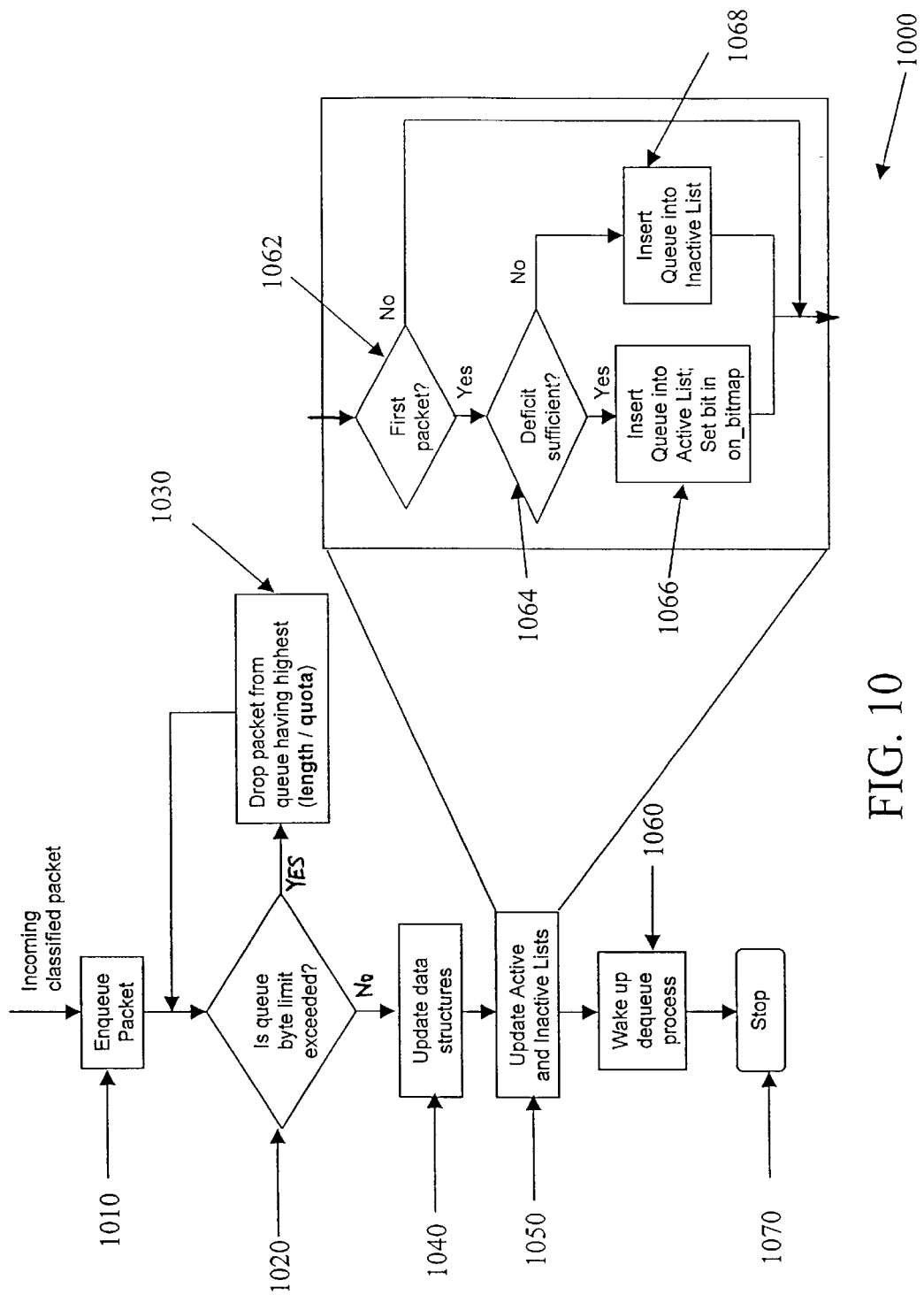

FIG. 10 illustrates in block diagram form an enhanced DRR+enqueue process, according to one aspect of the present invention.

Figure 11:
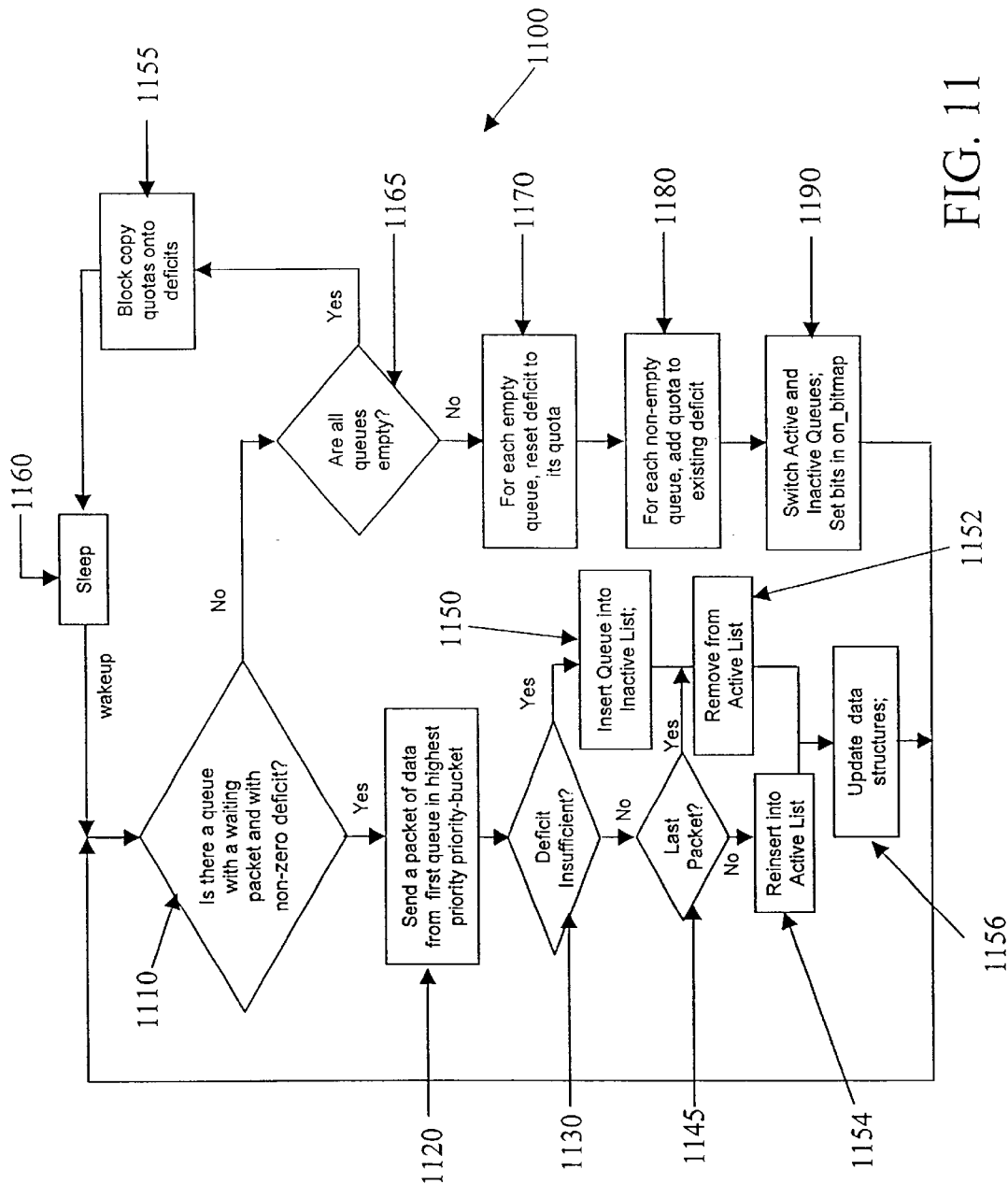

FIG. 11 illustrates in block diagram form an enhanced DRR+dequeue process, according to one aspect of the present invention.

Figure 12:
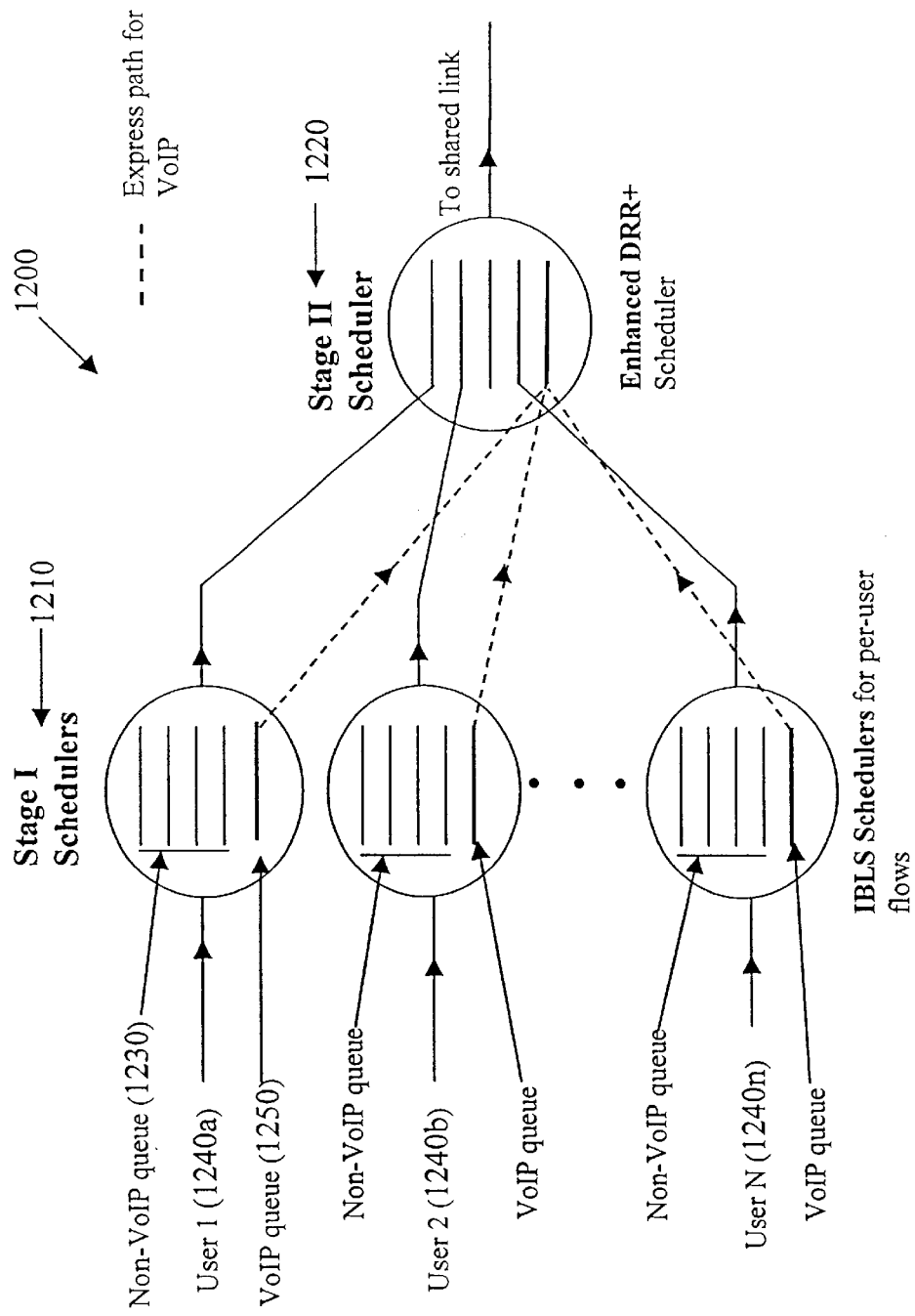

FIG. 12 shows a two stage quality of service architecture implemented by the present invention.

Figure 13:
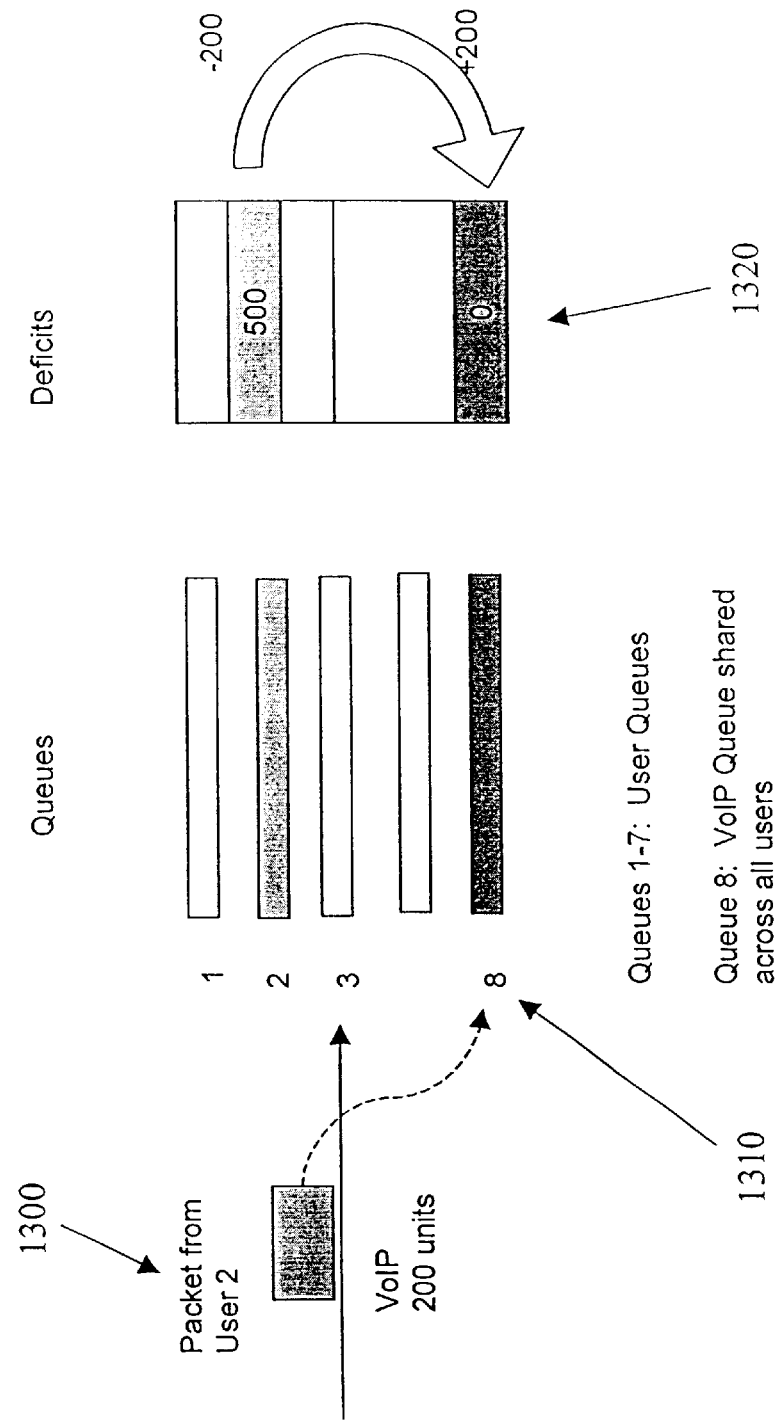

FIG. 13 shows a block diagram of a queue structure illustrating bandwidth borrowing, according to one illustrative embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of ordinary skill in the art, the present invention may be embodied as a method, a data processing system, or a computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the storage medium. Any suitable computer readable storage medium may be utilized including hard disks, CD-ROMs, optical storage devices, or magnetic storage devices.

The present invention is described below with reference to block diagrams and flowchart illustrations of methods, apparatus (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems which perform the specified functions or steps, or combinations of special purpose hardware and computer instructions.

Integrated Bandwidth Latency Scheduler (IBLS)

As shown in the block diagram of FIG. 4, the IBLS 420 of the present invention combines a Fair Queuing Scheduler 400 with a Priority Scheduler 410 in a single stage to provide both bandwidth fairness guarantees and latency prioritization. The present invention thus ensures that the latency experienced by packets, especially those of latency critical flows, is kept low, while maintaining bandwidth fairness among all packet flows. Further advantages of the present invention will be appreciated after the IBLS of the present invention is disclosed in detail with reference to the figures.

According to one embodiment of the invention, the well-known Deficit Round Robin (DRR) bandwidth scheduler, discussed above with reference to FIGS. 2, 3a and 3b, may be modified to incorporate prioritized latency support provided by the IBLS of the present invention. In this embodiment the IBLS utilizes similar components as those described above with reference to DRR, including an enqueue agent, a queue structure having multiple queues therein, a dequeue agent, and deficit and quota registers. However, in contrast to the round-robin approach utilized by the DRR algorithm, the dequeue process of the IBLS 420 determines the queue from which a packet (or a configurable number of bytes) will be transmitted immediately after the dequeue agent transmits the previous packet (or configurable number of bytes) over the outgoing link. Therefore, the IBLS algorithm of the present invention supports the notion of a round in which DRR-like bandwidth fairness is achieved, but in which reordering of packets is performed to cater to latency critical flows. To accomplish priority dequeuing, a dequeue agent of the IBLS quickly examines each queue that is ready to send data and ascertains the queue that has the highest priority. For instance, one particular queue may contain Voice over IP (VoIP) data that the dequeue agent recognizes has higher priority than data in other queues. Regardless of each queue position, the dequeue agent will send the latency-critical data from its corresponding queue to the outgoing link. Thus, the present invention utilizes a method of reordering packets within a round such that higher priority queues get to forward their packets earlier than the lower priority ones. This embodiment and process will be explained in greater detail with respect to FIGS. 5, 6 and 7.

An enqueue process 500 according to one aspect of the IBLS of the present invention is depicted in the flowchart of FIG. 5. On receiving a packet transmitted from an incoming link, the packet is initially classified as a particular type so that the packet can be mapped to its corresponding queue by the enqueue agent and process (block 510). This classification process is advantageous in this embodiment of IBLS because increasing queue number (i.e., farther down in the queue structure) corresponds to decreasing latency priority. As those of skill in the art will appreciate, the ordering of queues based on priority is done so as to enable quick ascertainment of the current highest priority queue. This is in direct contrast to DRR, where all queues have equal priority. For instance, referring again to the illustrative example shown in FIG. 3a, DRR treats the first and third queues equally, whereas IBLS guarantees the first queue a higher latency priority than the third queue. Thus, according to the IBLS algorithm, higher priority level translates to lower latency, in contrast to DRR, where all queues experience approximately the same latency.

To determine the destination queue in which a data packet having a corresponding queue should be placed into the queue structure, the enqueue agent classifies incoming packets based on the type of data included within the data packet, the source of the packet, the type of data flow, or another attribute of the packet, such as a header associated with the packet. For instance, the enqueue agent may classify data packets differently if the packets are VoIP, HTTP, FTP, Citrix (or any application service traffic), or other data types. To classify the packets based upon differing data types or other attributes, the IBLS can include a look-up table to ascertain the latency priority of particular types of data packets. For example, a VoIP packet may have an associated priority weight of 100, an HTTP packet a priority weight of 50, an FTP packet a priority weight of 10, and a Citrix data packet a priority weight of 75. In this example, upon receiving a VoIP packet the enqueue agent will identify and place the packet in first queue. A Citrix data packet will similarly be recognized and placed in the second queue by the enqueue agent, even where the Citrix data packet is received before the VoIP packet. Preferably, the IBLS algorithm enables an administrator to easily configure or alter the priority weights associated with particular types of data. Furthermore, it is preferable that the IBLS algorithm allows an administrator to easily earmark particular flows, and assign those flows whatever priority the administrator so desires.

Referring now again to FIG. 5, after a packet and its associated queue are identified, the packet is enqueued (block 510). However, to prevent excess data being built up in one or more queues within the queue structure, each queue or the entire queue structure may include a byte limit that should not be exceeded. In this embodiment, a byte limit exists for the entire queue structure, but it should be appreciated that the invention is not limited to this alone, and that it may also encompass per-queue byte limits. This feature is common in the enqueue processes of many common bandwidth schedulers including DRR. The enqueue process verifies that the queue structure byte limit is not exceeded by the addition of a packet to its corresponding queue (block 520). Were the byte limit is exceeded, a packet may be dropped from the queue structure. As will be appreciated by those of skill in the art, the queues and queue structure discussed herein may be defined and stored within a database or memory. According to the process illustrated in FIG. 5, a packet may be dropped from the tail end of the queue having the highest ratio of length to its associated quota (block 530). However, it should be appreciated that alternative methods may be implemented to determine a packet to be dropped, such as dropping the current packet, or dropping from the head of the queue having the highest length to quota ratio. After the packet is enqueued, the data structures of the queue structure are updated (block 540), as described below. This step includes updating the data structures (such as the queue bitmap that is described below) based on which the dequeue process decides the next packet to send, and the data structures needed to decide which queue the enqueue process should drop a packet from in case the byte count of the queuing structure overshot the specified byte limit. The dequeue process (block 550) is then initiated to transmit the packets from the queue structure over the outgoing link to their respective destinations.

The dequeue process 600 according to one embodiment of the invention is illustrated in the flow chart of FIG. 6. At each step in the dequeue process, the dequeue process 600 sends a small portion of data (either a single packet or a certain number of bytes of data, which might include a multiple number of packets) from a queue and determines from which queue to transmit the next portion of data from. As explained briefly above, the dequeue process enhances the conventional DRR dequeue process by reordering packets within a round (i.e., a cycle through each queue, although not necessarily in order, analogous to one pass in a round-robin approach) such that higher priority queues forward packets earlier than the lower priority queues. Although the dequeue process is unlike the DRR dequeue process in that queues are selected based on their priority and readiness (i.e., a ready queue is a queue that has a data waiting to be transmitted and sufficient deficit to transmit at least the first packet) to transmit packets, like DRR, the IBLS algorithm maintains DRR-like deficits and quotas for each queue, where the deficit is the number of bytes a queue can send in the current round of the dequeue process, as will be described with reference to FIGS. 7 and 8. The deficits and quotas, and arrays of deficits and quotas, as discussed in detail below, are contained within memory or one or more databases accessible by hardware and software components for executing the process described herein. As is illustrated at block 610, although ready queues are serviced in order of priority, the dequeue agent and process begins the next round of dequeuing when each queue in the structure is either empty or does not have sufficient deficit to send packets.

Where there is a queue with packets buffered therein, and the queue has sufficient deficit to transmit a packet (block 610), the oldest packet of the queue having the highest priority will be transmitted by the dequeue agent (block 620) and the deficit and data structures of the queue structure will be updated (block 630). The dequeue process then repeats the process, beginning the next step in a round by determining if there is a waiting queue with a non-zero deficit (block 610). On the other hand, where there is not a queue with sufficient deficit to transmit its next packet, the dequeue process determines whether all queues within the queue structure are empty (block 650). If each queue is empty, the quotas are reset to each queues' deficit (block 640), and the dequeue process enters a sleep mode (block 680), wherein it waits for a packet to be buffered by the enqueue agent into a queue to restart the dequeue process (block 610). The copying of the quota to each queue's deficit value if all queues are empty 640 is done by means of a block copy for efficiency. Where only some but not all of the queues are empty, the deficit of each empty queue is reset to the quota value (block 660), and for each non-empty queue, the quota is added to its existing deficit (block 670). Thereafter, the dequeue process repeats itself (block 610). It should further be noted that one of the aspects that differentiates the dequeue process of IBLS from that of DRR, described above, is that parameters such as deficit and quota are updated at the end of the round, instead of at the beginning of each round. Those skilled in the art will realize that the description above could have many more optimizations, and many of the above steps could be made more efficient; but nevertheless, the main steps suggested by the above will need to be performed.

The data structures associated with one embodiment of the IBLS system are illustrated in the block diagram of FIG. 7. The IBLS system includes a queue structure 700 located between an incoming link and an outgoing link. Incoming packets from data sources received via the incoming link are queued in the queue structure 700 by the enqueue agent and process 730 described above with respect to FIG. 5. Therefore, the queues are arranged in the queue structure such that queues are ordered on the basis of priority. According to this aspect of the invention, higher priority flows are assigned a lower queue number. However, the invention handles any other ordering scheme and hence is not limited by the ordering scheme described herein, as long as the ordering enables fast ascertainment of which is the ready queue with highest priority. The IBLS implementation also includes a dequeue agent implementing the dequeue process 740 described above with respect to FIG. 6. FIG. 7 also includes a quota array 720, which is an array indexed by queue number used to store predetermined bandwidth allocations, and a deficit array 710, which is a queue-number-indexed array of down-counted deficit amounts. As in the DRR illustrative example discussed above, the quota array 720 can be the same for all queues, or can vary for each queue of the queue structure 700. Also included in the IBLS system of the present invention is the deficit bitmap 750, which is a bitmap that stores a 1 or 0 bit for each queue in the queue structure 700. A bit corresponding to a queue is set to 1 if that queue has enough deficit to send its first packet; otherwise, the bit is set to 0. The queue bitmap 760 is a similar bitmap in which a bit is set to 1 if the corresponding queue has a packet waiting in it, and a 0 if the corresponding queue does not have a packet waiting in it.

The purpose of the deficit bitmap and queue bitmap, and the operation of the dequeue process is best understood with reference to the illustrative example shown in FIG. 8. Illustrated in FIG. 8 are four bitmaps 800 arranged by the enqueue agent and process 730 in order of decreasing priority. Therefore, queue 1 has a priority greater than each of the other queues in the illustration, queue 2 has a priority greater than each of the other queues except for queue 1, and so forth. Also illustrated in the block diagram is the deficit array 810, deficit bitmap 850, queue bitmap 860, and a composite bitmap 870, which is the created by AND-ing the deficit bitmap 850 and queue bitmap 860. The first queue includes two 60 byte packets and has a deficit of 500 (bytes)(this value is stored in the deficit array 810), the second bitmap includes one 60 byte packet and has a deficit of 5, the third queue includes one 60 byte packet and has a deficit of 100, and the fourth queue includes no packets and has a deficit of 60.

As noted above, in the deficit bitmap 850 a bit corresponding to a queue is set to 1 if that queue has enough deficit to send its first packet; otherwise, the bit is set to 0. Therefore, queues 1, 3 and 4 each include a deficit bitmap value of 1, as the deficit stored in the deficit array is sufficient to transmit the packets in the corresponding queues. However, because the deficit of queue 2 is less than the 60 byte packet size buffered in queue 2, the deficit bitmap includes a 0 bit for the second queue. The queue bitmap 860 includes bits that are set to 1 if the corresponding queue has a packet waiting in it. Therefore, the first three queues include 1 bits, while the fourth queue includes a 0 bit, as the fourth queue does not include a packet waiting in it for transmission.

The composite bitmap 870 is created by bitwise-AND-ing the deficit bitmap 850 elements with the corresponding elements in the queue bitmap 860 for each queue. If there is a 1 bit set in the composite bitmap, the queue corresponding to that bit both has a packet waiting and sufficient deficit to send the packet (i.e., it is prepared or ready to send a packet). Thus, the use of the composite bitmap allows the IBLS algorithm of the present invention to quickly determine those queues that are prepared to send packets. If the resultant bitmap is zero, then there is no queue ready to transmit a packet. Thus, in the dequeue process illustrated in FIG. 6, the determination of whether there is a queue with a waiting packet (block 610) is equivalent to testing if the resultant bitmap is non-zero. Moreover, given a resultant bitmap, finding the highest bit position can be implemented efficiently by means of a single (or a few) table lookup(s).

Continuing with the example illustrated in FIG. 8, according to the composite bitmap the first and third queues are ready to transmit packets. As a result, the dequeue process will attempt to transmit the packets within these queues prior to those having either insufficient deficit or no waiting packets. Because queue 1 has greater priority than queue 3, the dequeue process will begin by transmitting both 60 byte packets from the first queue, and reducing the deficit stored in the deficit array to 380 (see blocks 610, 620, 630). Note, however, that where the deficit is insufficient to complete the transmission of a packet in a queue the dequeue process will not transmit that packet, and will instead look for queues having a waiting packet and an adequate deficit. For instance, if the second packet in the first queue was 500 byte in size (rather than 60), the deficit would be insufficient to transmit the packet and the dequeue process would continue with the third queue. Continuing with the illustrative example of FIG. 8, after the two 60 byte packets are transmitted from the first queue, the dequeue process will transmit the packets from the third queue because the IBLS algorithm recognizes that the composite bitmap includes a 1 for the third queue. Thus, the second queue is skipped, unlike that which would occur in DRR or in round-robin queuing algorithms. After transmitting the 60 byte packet from the third queue, the dequeue process will determine if all the queues are empty (see block 650). Because the fourth queue is empty and the second queue has a 60 byte packet (and a queue bitmap value of 1) the deficit of the first, third and fourth queues will be reset to the queue's quota (see block 660), and the deficit of queue 2 will be increased by its quota (see block 670). Thereafter the dequeue process repeats (see block 610).

It should be appreciated that IBLS, unlike certain classical fair schedulers, uses a queue-wise allocation of quotas, which takes care of bandwidth apportioning on a per-round basis. It should also be noted that the present invention is unlike a strict round-robin scheduler (e.g., DRR); it can however be likened to a variant of DRR that uses queue-specific weighted-quotas. In IBLS, a new round begins when each queue is either empty or non-empty with insufficient deficit. Therefore, IBLS requires that the Fair Queuing Scheduler have a round or cycle in which bandwidth fairness is maintained. It should also be noted that because IBLS does not adhere to a strict round-robin process, the time complexity of the dequeue process is O(log n) (for n queues), which means that the time taken on a long term average by the dequeue process increases logarithmically as the number of queues is linearly increased. However, the time complexity of the enqueue process is O(1), such that the process is independent of the number of queues. In sum, using the IBLS systems and methods of the present invention, the per-round properties of DRR are retained while inside the round, the order in which packets are sent depend upon the priorities of queues that have packets waiting in them. As a result, IBLS guarantees weighted apportioning of bandwidth, has the same bandwidth fairness properties as a weighted variant of DRR, and provides multiple priority levels based on response time.

It will be appreciated that the IBLS embodiment discussed above with respect to FIGS. 5–8 made the assumptions that each queue has a unique latency priority associated with it, or equivalently, there are as many priority levels as the number of flows/queues, and that queues are ordered on the basis of priority to enable bitmap-based implementation. This implementation of IBLS enables table-lookup-based optimizations (e.g., finding the highest bit position in a bitmap is possible in just 2 table lookups for 16 queues), but requires that priorities be totally ordered such that equal priorities are not supported. Thus, two queues having equal priorities will not get the same latency preference, as one must precede the other. Although these assumptions are convenient in certain circumstances, an alternative solution in which an arbitrary number of priorities (i.e., from 1 to n, the number of queues) and an arbitrary ordering of queues may be desirable. The present invention provides an alternative solution that allows these capabilities.

Another embodiment of the IBLS of the present invention is illustrated in the block diagram of FIG. 9. In this implementation, the queues in the DRR queuing structure are mapped onto a number of active priority buckets 950. Priority buckets consist of an array whose elements contain pointers to two linked lists of queue records. Each queue is mapped onto to an element of the array depending upon its priority. Henceforth, an element of the priority bucket array is referred to as a priority bucket. According to this embodiment, it is possible that multiple queues map onto the same priority bucket. Whenever a packet arrives, an enqueue process 930 first determines the queue to which the packet is destined and then determines the active priority bucket 950 the queue is associated with (or mapped to). Each active priority bucket 950 contains two linked lists, the Active List 970 of queue records that represent the ready queues (i.e., have a packet that they can send immediately) that map to that active priority bucket 950, and the Inactive List 980 of queue records that have packets in them, but do not have enough deficit currently to send their first packet. Henceforth, we shall use the terms "insert the queue record into a List" and "insert the queue into the List" interchangeably. A bitmap (On bitmap) 960 is stored such that each priority bucket has a corresponding bit that is set to 1 if the corresponding Active List is not empty and is set to 0 otherwise. Thus, by checking if a certain bit is set, one can decide if the corresponding priority bucket has any ready queues that map onto it. This point enables an efficient table lookup based implementation to ascertain the priority bucket of highest priority that has ready queues in its Active List. More generally, if the On bitmap is non-zero, i.e., has at least one bit set, then it means that there is one priority bucket that has a ready queue. This property is made use of by the dequeue process 940.

The enqueue process 930 is implemented according to the flowchart shown in FIG. 10. The enqueue processing in this embodiment is almost identical to that illustrated in FIG. 5 with the only difference being an additional set of operations (block 1050). When an incoming packet arrives, it is enqueued into the appropriate queue (block 1010), as discussed previously, and a check is made to see if the byte limit on the queue structure is exceeded (block 1020). If it is exceeded, packets are dropped suitably to reduce queue structure byte usage (block 1030). The same update operations (block 1040) as described in the context of FIG. 5. (block 540) are then performed on the data structures. The active and inactive lists specific to this embodiment are then updated (block 1050). More specifically, if the incoming packet is the first packet (block 1062) entering an empty queue contained inside the queue structure, a check is made to see if the deficit pertaining to this queue is sufficient to send the packet (block 1064). If the deficit is sufficient to send the packet, the queue (i.e., the queue record) is then inserted into the Active List (block 1066) corresponding to the queue's priority bucket (array element of the priority buckets) and the bit corresponding to the current priority bucket is set in the On bitmap. If the deficit is not sufficient, the queue is inserted into the Inactive List (block 1068) corresponding to the queue's priority bucket. It should be appreciated, however, that the foregoing steps are performed only if the incoming packet is the first to enter an empty queue.

The dequeue process 940 shown in FIG. 11 is also similar to the one illustrated in FIG. 6, albeit more elaborate. The dequeue process begins by determining if there is a packet to ready to be sent from the queuing structure (block 1110). This check is performed by checking if the On bitmap 960 is non-zero (i.e., has at least one bit set). If so, the priority bucket corresponding to the highest bit position and thus of the highest priority is chosen and the first queue in its Active List is allowed to send a packet (or a configurable number of bytes) (block 1120). After sending a packet (or a certain number of bytes), if the deficit of the current queue is insufficient to send its next packet (which supposes that a next packet exists) (block 1130) the queue record is inserted (block 1150) into the corresponding Inactive List 980 and removed from the Active List (block 1152). If however, the deficit is sufficient, a check is made to see if the queue is now empty (block 1145). If this occurs, the queue is removed from the corresponding Active List 970, and is not inserted on the Inactive List since the queue is empty. However, if this check fails, the current queue is reinserted at the end of the Active List (block 1154) so as to enable other ready queues to send their packets in succeeding rounds without incurring a high latency, thereby insuring that all queues having the same priority have the same latency over the long term. In either case, updates are performed (block 1156) on the data structures such as the On bitmap in order to maintain consistency. Returning to the check (block 1110) to see if there is a ready queue to send a packet from, if this check turns out to be false (i.e., no more ready queues are available), then a check is made to see if all queues are empty (block 1165). This is similar to the check made in (block 650) the process of FIG. 6. If this check is true, the quotas are block-copied onto the deficits for efficiency reasons (block 1155) (as in block 640) and the dequeue process 940 enters a sleep mode. If this check (block 1165) is false, steps are taken in a manner similar to those illustrated in FIG. 6 (see, e.g., blocks 660 and 670). The deficits of empty queues are reset to their respective quotas 1170, and those of non-empty queues are increased by their quotas (block 1180). In addition, the Active and Inactive Lists in the priority buckets are switched in their function (block 1190) since the Active List is empty. This means that the Active List of a priority bucket would now function as the Inactive List and vice versa. This switching is easily enabled by storing the Active List and Inactive List as pointers. One skilled in the art would also understand that such switching can be accomplished quickly and simultaneously in all priority buckets if these pointers are stored as elements of a two element array (indexed by two indices 0 and 1) and a global variable is maintained to indicate if the index of 1 (or 0) corresponds to the Active List pointer or if it corresponds to the Inactive List pointer. This process is repeated as long as there are non-empty queues.

It should be appreciated that when the next dequeue cycle starts, the priority bucket being serviced may have queues that cannot send packets because the deficit (which would have been increased at the end of the previous cycle) is still insufficient to send the packet waiting at the head of the queue. The dequeue process can remove such queues from the active list and transfers them to the end of the inactive list. This method postpones the detailed updating of the active and inactive lists until the next cycle and instead performs a quick switch of the active and inactive queues. This method works well under conditions of congestion, where one can expect several queues to have outstanding packets. In another embodiment, the dequeue process can re-evaluate the place of each queue (in the active or inactive list) at the time it increases the deficit of each queue at the end of the cycle. This process would be beneficial in periods of low congestion. However, it should be appreciated that the present invention is not restricted to a single method for starting a new cycle and thus the above methods represent only two possible embodiments for starting a new cycle.

According to this embodiment of the present invention, an arbitrary number of priority levels may be used (from 1 to n). This ensures that all queues having the same priority experience the same average latency since all such queues are mapped onto the same priority bucket and on sending a packet (or configurable number of bytes) from a queue, it is reinserted at the end of the priority bucket's Active List. This is an enhancement over the previous embodiment where the provision of equal priority queues was not possible. However, this implementation is more complicated than the previous implementation, and may require a slightly higher run-time overhead to execute. The time complexity for the enqueue and dequeue processes are the same as in the first embodiment.

In yet another embodiment of the invention, a Binary Heap (usually used to implement Priority Queue data structures) structure is incorporated to enable fast ascertainment of the highest priority queue that is currently ready. Those skilled in the art will be well aware that a binary heap allows efficient retrieval of the highest priority record in a given set of records. The implementation complexities for insertion and deletion into a binary heap are both O(log n). This implementation involves the insertion of a queue record into the binary heap once it becomes ready and deletion from the binary heap once it becomes either empty or its deficit becomes insufficient. The heap structure allows a flexible number of priority levels (1 to n) since it is impartial to two records of the same priority number. To enable low latency, it would be important to remove and reinsert a queue record into the binary heap once it has sent a packet (or a configurable number of bytes) so as to allow a queue of a priority equal to or greater than the current queue to get an opportunity to send its packet (or configurable number of bytes) without a large delay. This implementation would incur a greater run-time overhead than both the implementations discussed above. However, it uses a standard, well understood data structure to accomplish priority scheduling.

In summary, IBLS systems and methods guarantee fair bandwidth, allow bandwidth bursting without compromising fairness, and provide multiple latency priority levels. Furthermore, systems and methods of the present invention are amenable to light-weight implementation, allow for easy configuration of bandwidth and latency assignments, and are ideal where fine-grained control over per-flow latency is needed. Additionally, an IBLS according to the present invention provides better differentiation in latency and less jitter to higher priority flows in uncongested or near-congested network conditions.

Enhanced DRR+: Bandwidth Borrowing

In addition to the IBLS implementations described in detail above, the present invention provides another weighted fair queuing algorithm to provide express paths to latency critical components of user flows while providing overall bandwidth guarantees to user flows. As an illustrative example, an administrator of a network may wish to restrict the bandwidth available to users according to their payment plan, but still ensure that certain traffic components, such as VoIP, of all users still experience low delay and jitter. In such a scenario, the following feature of this invention will prove useful and appropriate. According to this feature of the present invention, the latency sensitive traffic components of all user flows are channeled into one global latency critical queue while all other user traffic use their own separate non-latency critical queues. This is done in a manner which ensures that no bandwidth unfairness results by channeling the latency critical components of all user flows into a common latency critical queue.

To fully describe the aforementioned feature, an illustrative scenario may be considered where one desires that traffic originating from each user is limited to a certain fraction of the link bandwidth, and that the application components of the user's traffic are differentiated according to a predefined profile of bandwidths and priorities. In addition, it may be required, under some circumstances, that a certain latency critical traffic component (VoIP, for instance) of all user flows experiences very low latency when compared with all other traffic types. To solve this problem, this invention enunciates a two step solution as is illustrated in FIG. 12. The second stage 1220 of the scheduler is an Enhanced DRR+scheduler that is responsible for fairly apportioning bandwidth among users 1240a, 1240b, . . . , 1240n, while also ensuring low latency for the VoIP traffic components (although other latency sensitive traffic components could also be similarly scheduled). The first stage 1210 of the scheduler consists of IBLSs that apportion user bandwidth to user applications. The first stage queue has a queue per user application and FIG. 12 shows the VoIP queue 1250 corresponding to User 1 1240a as being one among its application specific queues Both VoIP data and Non-VoIP data is transmitted to the second stage Enhanced DRR+scheduler that puts the non-VoIP components of user traffic into respective user queues within the Stage II Scheduler 1220, and aggregates the VoIP packets received from each of the Stage I Schedulers 1210, such that the Stage II Scheduler can separate the VoIP packets from other data, so as to ensure low pass-through latency to VoIP traffic. It should be noted that this special provision for VoIP components of user traffic does not affect overall bandwidth fairness to user flows. This means that if the fairness criteria in the Stage II Scheduler 1220 is such that User 1 1240a is allowed to send twice as many data units in a round as User 2 1240b, then, the special scheduling of the VoIP components of either User 1 or User 2 will not affect this fairness specification. It merely makes sure that the VoIP components in the traffic generated by User 1 and User 2 experience very low latency. Although in the above discussion VoIP was used as an example of latency critical flow, it will be appreciated that this aspect of the present invention is not limited to VoIP as the sole latency critical flow.

According to one aspect of the invention, bandwidth borrowing may be used to provide especially low latency to flow components that are latency critical. FIG. 13 shows a block diagram of a queue structure illustrating bandwidth borrowing, according to one illustrative embodiment of the present invention. In FIG. 13, a latency critical VoIP packet 1300 belonging to aggregated flow 3 may need to be handled quickly. Hence, it may be placed in the latency critical queue 8 1310 which is handled specially by the Stage II scheduler so as to provide it very low latency. But while doing so, a corresponding deficit from the respective user queue in which non-VoIP packets from the same aggregated flow would be placed may be borrowed to ensure overall bandwidth fairness. Where the deficit in the respective user queue is insufficient, the aggregated flow is either misbehaving or has exhausted its deficit for the current round and will have to wait for its turn in the next round. Thus, if the deficit is insufficient, it is fair to enqueue the latency critical packet not into the latency critical queue, but into the respective user queue that corresponds to its aggregated flow without needing to borrow bandwidth. To avoid misordering of data, latency critical packets are channeled to the latency critical queue only if there are no other latency critical packets already existing in the respective user queue. As a consequence latency critical packets may sometimes pass through the respective user queue instead of the latency critical queue. Barring this case, latency critical flows would benefit from the latency critical cut-through path. This aforementioned aspect of the invention relies on the idea of borrowing bandwidth to ensure bandwidth fairness and uses a latency critical queue to channel latency critical traffic.

As discussed above, IBLS schedulers according to the present invention apportion user bandwidth appropriately among its application flows, ensures fair sharing of extra available bandwidth, and prioritizes application traffic based on latency. The IBLS integrates a cycle-based fair bandwidth scheduler and a conventional priority scheduler into a single queuing stage in order to provide a combination of bandwidth fairness and multiple levels of latency criticality. This not only avoids the queuing-theoretic flaws introduced by a two-stage design but also reduces the latency experienced by a packet. The dedicated queues and bandwidth borrowing features of the present invention discussed above, also apportion link bandwidth among users, ensure fair sharing of extra bandwidth among various users, and provide a fast path for latency critical application flows.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for limiting latency for latency-critical network traffic, comprising:

receiving at a queue structure a plurality of data packets associated with at least one source, wherein said queue structure comprises a plurality of queues, and wherein each queue of said plurality of queues is ranked in said queue structure;

identifying an attribute associated with one of said plurality of data packets;

determining a queue of said plurality of queues to receive said one of said plurality of data packets, wherein said queue is identified based upon said attribute, and wherein said queue is ranked in said queue structure based at least in part upon said attribute;

placing said one of said plurality of data packets into said queue; and dequeuing said one of said plurality of data packets from said queue structure based at least in part upon the rank of said queue in said queue structure.

2. The method of claim 1, further comprising the step of identifying one or more queues prepared to immediately transmit at least one data packet prior to dequeuing said one of said plurality of data packets.

3. The method of claim 2, wherein the step of dequeuing each data packet comprises dequeuing data packets from said one or more queues that are prepared to immediately transmit at least one data packet based at least in part upon the rank of said one or more queues in said queue structure.

4. The method of claim 1, further comprising the step of maintaining a deficit array, wherein the deficit array contains a respective deficit amount representing the quantity of data, within one or more data packets, that may be immediately dequeued from each queue within the queue structure.

5. The method of claim 4, further comprising the step of updating a deficit bitmap, wherein said deficit bitmap maintains a plurality of bits, wherein each bit represents whether the deficit amount exceeds the quantity of data within an initial data packet that may be immediately dequeued from a corresponding queue within the queue structure.

6. The method of claim 1, further comprising the step of maintaining a quota array, wherein a respective quota amount of the quota array represents an additional quantity of data, within one or more data packets, that may be consecutively dequeued from a respective queue within the queue structure.

7. The method of claim 6, further comprising the step of maintaining a queue bitmap wherein said queue bitmap maintains a plurality of bits, wherein each bit represents whether a corresponding queue within the queue structure has a packet of data.

8. The method of claim 1, wherein the identifying an attribute associated with one of said plurality of data packets comprises identifying the attribute within a header of said one of said plurality of data packets.

9. The method of claim 8, wherein identifying an attribute associated with one of said plurality of data packets comprises identifying, within the header, that said one of said plurality of data packets is a Voice Over Internet Protocol, Hyper Text Transfer Protocol, File Transfer Protocol, or Citrix data type.

10. The method of claim 1, further comprising the step of establishing a byte limit for each queue in said queue structure prior to the step of placing said one of said plurality of data packets into said queue.

11. The method of claim 10, wherein the step of placing said one of said plurality of data packets into said queue comprises the step of determining whether said one of plurality of data packets includes a number of bytes that exceeds the byte limit for said queue.

12. The method of claim 1, further comprising the step of maintaining a deficit for each queue, wherein said deficit represents the quantity of data, within one or more data packets, that may be immediately dequeued from each respective queue within the queue structure.

13. The method of claim 12, further comprising the step of maintaining a quota for each queue, wherein said quota represents an additional quantity of data, within one or more data packets, that may be consecutively dequeued from a respective queue within the queue structure.

14. The method of claim 13, wherein said step of dequeuing comprises dequeuing subsequent data packets from said queue structure based upon the rank of each other queue in said queue structure.

15. The method of claim 14, wherein the step of dequeuing further comprises updating the deficit of each empty queue to the quota.

16. The method of claim 14, wherein the step of dequeuing further comprises adding the quota to the deficit of each non-empty queue.

17. The method of claim 14, wherein dequeuing subsequent data packets from said queue structure based upon the rank of each other queue in said queue structure comprises repeatedly dequeuing subsequent data packets from said queue structure until said initial data packets in each respective queue are larger than the deficit for respective queues.

18. The method of claim 1, further comprising the step of identifying whether said attribute indicates whether said one of said plurality of data packets represents data that is latency critical or latency non-critical.

19. The method of claim 18, further comprising the steps of:

establishing a latency critical second stage queue structure; and receiving at said latency critical second stage queue structure said one of said plurality of data packets where said attribute indicates that said one of said plurality of data packets represents data that is latency critical.

20. The method of claim 19, further comprising the steps of:

establishing a latency non-critical second stage queue structure; and receiving at said latency non-critical second stage queue structure said one of said plurality of data packets where said attribute indicates that said one of said plurality of data packets represents data that is latency non-critical.

21. The method of claim 20, wherein said step of establishing a latency non-critical second stage queue structure comprises establishing a latency non-critical second stage queue structure comprising a plurality of latency non-critical queues.

22. The method of claim 21, further comprising the step of maintaining a non-critical queue structure deficit for each latency non-critical queue, wherein said deficit represents the quantity of data, within one or more data packets, that may be immediately dequeued from each respective queue within the non-critical second stage queue structure.

23. The method of claim 22, further comprising the step of maintaining a critical queue structure quota for each latency critical queue within said critical queue structure quota, wherein said quota represents an additional quantity of data, within one or more data packets, that may be consecutively dequeued from a respective queue within the critical second stage queue structure.

24. The method of claim 23, further comprising the steps of borrowing at least a portion of said non-critical queue structure deficit and adding said portion to said critical queue structure quota.

25. The method of claim 20, wherein the step of receiving comprises receiving at said latency non-critical second stage queue structure said one of said plurality of data packets subsequent to said one of said plurality of data packets being dequeued from said queue structure.

26. The method of claim 1, further comprising the step of mapping each one of said plurality of queues within said queue structure to an associated element within an active priority bucket, wherein said associated element points to an active list or inactive list associated with said active priority bucket, wherein said active list identifies the queues prepared to immediately dequeue a data packet, and wherein said inactive list identifies the queues that contain data packets but are not prepared to immediately dequeue the data packets.

27. A computer program product for limiting latency for latency-critical network traffic, comprising:
a computer readable storage medium having computer-readable program code means embodied in said medium, said computer-readable program code means comprising:
computer readable program code means for receiving at a queue structure a plurality of data packets associated with at least one source, wherein said queue structure comprises a plurality of queues, and wherein each queue of said plurality of queues is ranked in said queue structure;
computer readable program code means for identifying an attribute associated with one of said plurality of data packets; and
computer readable program code means for determining a queue of said plurality of queues to receive said one of said plurality of data packets, wherein said queue is identified based upon said attribute, and wherein said queue is ranked in said queue structure based at least in part upon said attribute;
computer readable program code means for placing said one of said plurality of data packets into said queue; and
computer readable program code means for dequeuing said one of said plurality of data packets from said queue structure based at least in part upon the rank of said queue in said queue structure.

28. The computer program product of claim 27, further comprising computer readable program code means for identifying one or more queues prepared to immediately transmit at least one data packet prior to dequeuing said one of said plurality of data packets.

29. The computer program product of claim 28, wherein the computer readable program code means for dequeuing each data packet comprises computer readable program code means for dequeuing data packets from said one or more queues that are prepared to immediately transmit at least one data packet based at least in part upon the rank of said one or more queues in said queue structure.

30. The computer program product of claim 27, further comprising computer readable program code means for maintaining a deficit array, wherein the deficit array contains a respective deficit amount representing the quantity of data, within one or more data packets, that may be immediately dequeued from each queue within the queue structure.

31. The computer program product of claim 30, further comprising computer readable program code means for updating a deficit bitmap, wherein said deficit bitmap maintains a plurality of bits, wherein each bit represents whether the deficit amount exceeds the quantity of data within an initial data packet that may be immediately dequeued from a corresponding queue within the queue structure.

32. The computer program product of claim 27, further comprising computer readable program code means for maintaining a quota array, wherein a respective quota amount of the quota array represents an additional quantity of data, within one or more data packets, that may be consecutively dequeued from a respective queue within the queue structure.

33. The computer program product of claim 32, further comprising computer readable program code means for maintaining a queue bitmap wherein said queue bitmap maintains a plurality of bits, wherein each bit represents whether a corresponding queue within the queue structure has a packet of data.

34. The computer program product of claim 27, wherein the computer readable program code means for identifying an attribute associated with one of said plurality of data packets comprises computer readable program code means for identifying the attribute within a header of said one of said plurality of data packets.

35. The computer program product of claim 34, wherein the computer readable program code means for identifying an attribute associated with one of said plurality of data packets comprises computer readable program code means for identifying, within the header, that said one of said plurality of data packets is a Voice Over Internet Protocol, Hyper Text Transfer Protocol, File Transfer Protocol, or Citrix data type.

36. The computer program product of claim 27, wherein the computer readable program code means for identifying an attribute associated with one of said plurality of data packets comprises computer readable program code means for establishing a byte limit for each queue in said queue structure prior to the step of placing said one of said plurality of data packets into said queue.

37. The computer program product of claim 36, wherein the computer readable program code means for placing said one of said plurality of data packets into said queue comprises computer readable program code means for determining whether said one of plurality of data packets includes a number of bytes that exceeds the byte limit for said queue.

38. The computer program product of claim 27, further comprising computer readable program code means for maintaining a deficit for each queue, wherein said deficit represents the quantity of data, within one or more data packets, that may be immediately dequeued from each respective queue within the queue structure.

39. The computer program product of claim 38, further comprising computer readable program code means for maintaining a quota for each queue, wherein said quota represents an additional quantity of data, within one or more data packets, that may be consecutively dequeued from a respective queue within the queue structure.

40. The computer program product of claim 39, wherein said computer readable program code means for dequeuing comprises computer readable program code means for dequeuing subsequent data packets from said queue structure based upon the rank of each other queue in said queue structure.

41. The computer program product of claim 40, wherein said computer readable program code means for dequeuing further comprises computer readable program code means for updating the deficit of each empty queue to the quota.

42. The computer program product of claim 40, wherein said computer readable program code means for dequeuing further comprises computer readable program code means for adding the quota to the deficit of each non-empty queue.

43. The computer program product of claim 40, wherein said computer readable program code means for dequeuing subsequent data packets from said queue structure based upon the rank of each other queue in said queue structure comprises computer readable program code means for repeatedly dequeuing subsequent data packets from said queue structure until said initial data packets in each respective queue are larger than the deficit for respective queues.

44. The computer program product of claim 27, further comprising computer readable program code means for identifying whether said attribute indicates whether said one of said plurality of data packets represents data that is latency critical or latency non-critical.

45. The computer program product of claim 44, further comprising:
  computer readable program code means for establishing a latency critical second stage queue structure; and
  computer readable program code means for receiving at said latency critical second stage queue structure said one of said plurality of data packets where said attribute indicates that said one of said plurality of data packets represents data that is latency critical.

46. The computer program product of claim 45, further comprising:
  computer readable program code means for establishing a latency non-critical second stage queue structure; and
  computer readable program code means for receiving at said latency non-critical second stage queue structure said one of said plurality of data packets where said attribute indicates that said one of said plurality of data packets represents data that is latency non-critical.

47. The computer program product of claim 46, wherein said computer readable program code means for establishing a latency non-critical second stage queue structure comprises computer readable program code means for establishing a latency non-critical second stage queue structure comprising a plurality of latency non-critical queues.

48. The computer program product of claim 47, further comprising computer readable program code means for maintaining a non-critical queue structure deficit for each latency non-critical queue, wherein said deficit represents the quantity of data, within one or more data packets, that may be immediately dequeued from each respective queue within the non-critical second stage queue structure.

49. The computer program product of claim 48, further comprising computer readable program code means for maintaining a critical queue structure quota for each latency critical queue within said critical queue structure quota, wherein said quota represents an additional quantity of data, within one or more data packets, that may be consecutively dequeued from a respective queue within the critical second stage queue structure.

50. The computer program product of claim 49, further comprising computer readable program code means for borrowing at least a portion of said non-critical queue structure deficit and adding said portion to said critical queue structure quota.

51. The computer program product of claim 46, wherein the computer readable program code means for receiving comprises computer readable program code means for receiving at said latency non-critical second stage queue structure said one of said plurality of data packets subsequent to said one of said plurality of data packets being dequeued from said queue structure.

52. The computer program product of claim 27, further comprising computer readable program code means for mapping each one of said plurality of queues within said queue structure to an associated element within an active priority bucket, wherein said associated element points to an active list or inactive list associated with said active priority bucket, wherein said active list identifies the queues prepared to immediately dequeue a data packet, and wherein said inactive list identifies the queues that contain data packets but are not prepared to immediately dequeue the data packets.

53. A system for limiting latency for latency-critical network traffic, comprising:
  a queue structure comprising a plurality of ranked queues, wherein said queue structure receives a plurality of data packets from a source;
  an enqueue agent, wherein said enqueue agent identifies an attribute associated with one of said plurality of data packets, and wherein said enqueue agent determines a queue of said plurality of queues to receive said one of said plurality of data packets, wherein said queue is identified based upon said attribute, and wherein said queue is ranked in said queue structure based at least in part upon said attribute; and
  a dequeue agent, wherein said dequeuing agent dequeues said one of said plurality of data packets from said queue structure based at least in part upon the rank of said queue in said queue structure.

54. The system of claim 53, wherein the dequeue agent is operable to dequeue data packets from said one or more queues that are prepared to immediately transmit at least one data packet based at least in part upon the rank of said one or more queues in said queue structure.

55. The system of claim 53, further comprising a deficit array, wherein the deficit array contains a respective deficit amount representing the quantity of data, within one or more data packets, that may be immediately dequeued from each queue within the queue structure.

56. The system of claim 55, further comprising a deficit bitmap, wherein said deficit bitmap is operable to maintain a plurality of bits, wherein each bit represents whether the deficit amount exceeds the quantity of data within an initial data packet that may be immediately dequeued from a corresponding queue within the queue structure.

57. The system of claim 53, further comprising a quota array, wherein a respective quota amount of the quota array represents an additional quantity of data, within one or more data packets, that may be consecutively dequeued from a respective queue within the queue structure.

58. The system of claim 57, further comprising a queue bitmap wherein said queue bitmap is operable to maintain a plurality of bits, wherein each bit represents whether a corresponding queue within the queue structure has a packet of data.

59. The system of claim 53, wherein said enqueue agent is operable to identify an attribute within a header of said one of said plurality of data packets.

60. The system of claim 59, wherein said attribute associated with one of said plurality of data packets comprises an attribute that identifies that said one of said plurality of data packets is a Voice Over Internet Protocol, Hyper Text Transfer Protocol, File Transfer Protocol, or Citrix data type.

61. The system of claim 60, further comprising a byte limit associated with each queue in said queue structure, and wherein said enqueue agent comprises an enqueue agent operable to determine whether said one of plurality of data packets includes a number of bytes that exceeds the byte limit for said queue.

62. The system of claim 53, further comprising a deficit for each queue, wherein said deficit represents the quantity of data, within one or more data packets, that may be immediately dequeued from each respective queue within the queue structure.

63. The system of claim 62, wherein each queue has an associated quota representing an additional quantity of data, within one or more data packets, that may be consecutively dequeued from a respective queue within the queue structure.

64. The system of claim 63, wherein said dequeue agent is operable to dequeue subsequent data packets from said queue structure based upon the rank of each other queue in said queue structure.

65. The system of claim 64, wherein dequeue agent is operable to update the deficit of each empty queue to the quota.

66. The system of claim 53, further comprising an active priority bucket, wherein said active priority bucket maps each one of said plurality of queues within said queue structure to an associated element within said active priority bucket, wherein said associated element points to an active list or inactive list associated with said active priority bucket, wherein said active list identifies the queues prepared to immediately dequeue a data packet, and wherein said inactive list identifies the queues that contain data packets but are not prepared to immediately dequeue the data packets.

* * * * *